United States Patent
Tokumitsu et al.

(10) Patent No.: US 10,003,804 B2
(45) Date of Patent: Jun. 19, 2018

(54) VIDEO CODING DEVICE USING QUANTIZING AN ORTHOGONAL TRANSFORM COEFFICIENT

(71) Applicant: NEC Corporation, Minato-ku, Tokyo (JP)

(72) Inventors: Kenta Tokumitsu, Tokyo (JP); Keiichi Chono, Tokyo (JP)

(73) Assignee: NEC CORPORATION, Tokyo (JP)

( * ) Notice: Subject to any disclaimer, the term of this patent is extended or adjusted under 35 U.S.C. 154(b) by 218 days.

(21) Appl. No.: 14/651,466

(22) PCT Filed: Dec. 3, 2013

(86) PCT No.: PCT/JP2013/007080
§ 371 (c)(1),
(2) Date: Jun. 11, 2015

(87) PCT Pub. No.: WO2014/103182
PCT Pub. Date: Jul. 3, 2014

(65) Prior Publication Data
US 2015/0319440 A1    Nov. 5, 2015

(30) Foreign Application Priority Data
Dec. 27, 2012 (JP) ................. 2012-285238

(51) Int. Cl.
*H04N 19/126* (2014.01)
*H04N 19/65* (2014.01)
(Continued)

(52) U.S. Cl.
CPC ......... *H04N 19/126* (2014.11); *H04N 19/124* (2014.11); *H04N 19/13* (2014.11);
(Continued)

(58) Field of Classification Search
CPC .... H04N 19/126; H04N 19/124; H04N 19/13; H04N 19/132; H04N 19/147;
(Continued)

(56) References Cited

U.S. PATENT DOCUMENTS

| 2003/0048956 A1* | 3/2003 | Mitchell | G06T 3/60 |
| | | | 382/250 |
| 2012/0207400 A1* | 8/2012 | Sasai | H03M 7/4018 |
| | | | 382/233 |
| 2014/0269928 A1* | 9/2014 | Piao | H04N 19/91 |
| | | | 375/240.18 |

FOREIGN PATENT DOCUMENTS

| JP | 2010-87771 A | 4/2010 |
| JP | 2011-509642 A | 3/2011 |

(Continued)

OTHER PUBLICATIONS

Michael Lavrentiev and David Malah "Transrating of MPEG-2 coded video via requantization with optimal trellis-based OCT coefficients modification", 12th European Signal Processing Conference, pp. 1963-1966, Sep. 2004.*

(Continued)

*Primary Examiner* — Jamie Atala
*Assistant Examiner* — Ayman Abaza

(57) ABSTRACT

The quantization unit calculates the number of bits of location information determined based on the location of a coefficient level to be significant first in order of transmission and included in the image block, calculates the number of value information bits of a coefficient level to be significant, and sets a coefficient level to be significant in which the number of location information bits and the number of value information bits meet a predetermined condition to 0.

10 Claims, 21 Drawing Sheets

(51) Int. Cl.
*H04N 19/91* (2014.01)
*H04N 19/149* (2014.01)
*H04N 19/13* (2014.01)
*H04N 19/132* (2014.01)
*H04N 19/18* (2014.01)
*H04N 19/147* (2014.01)
*H04N 19/15* (2014.01)
*H04N 19/124* (2014.01)

(52) U.S. Cl.
CPC ......... *H04N 19/132* (2014.11); *H04N 19/147* (2014.11); *H04N 19/149* (2014.11); *H04N 19/15* (2014.11); *H04N 19/18* (2014.11); *H04N 19/65* (2014.11); *H04N 19/91* (2014.11)

(58) Field of Classification Search
CPC ...... H04N 19/149; H04N 19/15; H04N 19/18; H04N 19/65; H04N 19/91
USPC ..................................................... 375/240.03
See application file for complete search history.

(56) References Cited

FOREIGN PATENT DOCUMENTS

| | | |
|---|---|---|
| JP | 2011-176483 A | 9/2011 |
| WO | 2012/075193 A1 | 6/2012 |

OTHER PUBLICATIONS

Farag Elnagahy and Boris Simak "Wavelet-based embedded rate scalable still image coders: a review", ACTA Polytechnica, vol. 44, No. 1, Jan. 2004, pp. 3-17.*

G. Strang, "The discrete cosine transform", SIAM Review, 41 (1999).*

International Search Report for PCT Application No. PCT/JP2013/007080, dated Mar. 4, 2014.

High efficiency video coding (HEVC) text specification draft 9, JCTVC-K1003_v9, Joint Collaborative Team on Video Coding (JCT-VC) of ITU-T SG16 WP3 and ISO/IEC JTC1/SC29/WG11 11th Meeting: Shanghai, CN, 10209 Oct. 2012.

Lavrentiev Michael et al: "Translating of MPEG-2 coded video via requantization with optimal trellis-based DCT coefficients modification", 2004 12th European Signal Processing Conference, IEEE, Sep. 6, 2004, pp. 1963-1966, XP032760574, ISBN: 978-3-200-00165-7 English Abstract Cited in EESR.

Lagendijkr R. L. et al: "Low-complexity rate-distortion optimal transcoding of MPEG I-frames—A Mathematical Basis for Data Compression", Signal Processing, Image Communication, Elsevier Science Publishers, Amsterdam NL. vol. 15, No. 6, Mar. 1, 2000, pp. 531-544, XP004186675, ISSN: 0923-5965, English Abstract Cited in EESR.

Extended European Search Report for EP Application No. EP13868141.6 dated May 6, 2016.

\* cited by examiner

FIG. 18
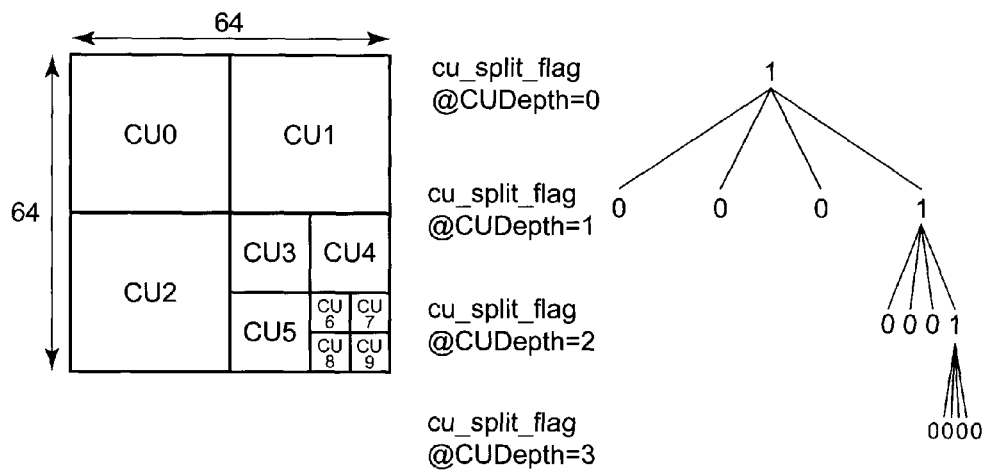
FIG. 19
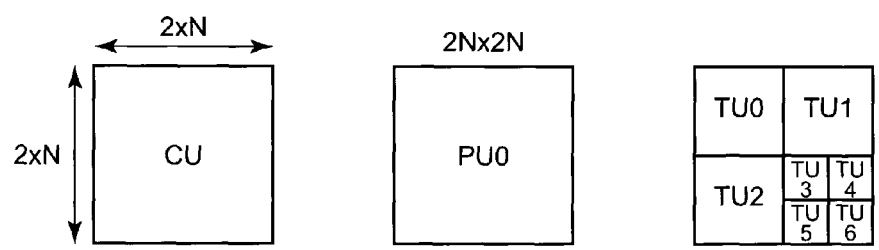
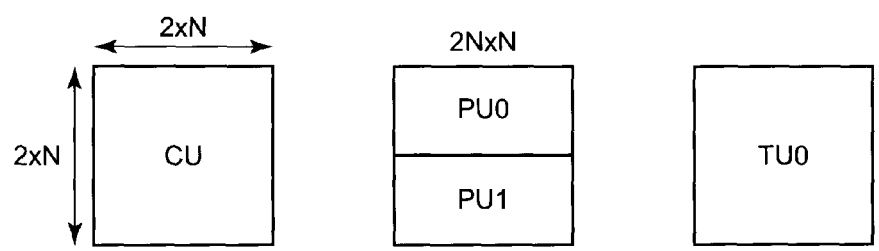

FIG. 22

| | SYNTAX | COEFFICIENT LEVEL $L_{ij}$ | | | | | | | | | | | | | | | |
|---|---|---|---|---|---|---|---|---|---|---|---|---|---|---|---|---|---|
| | | $L_{33}=0$ | $L_{32}=0$ | $L_{23}=0$ | $L_{31}=0$ | $L_{22}=0$ | $L_{13}=0$ | $L_{30}=1$ | $L_{21}=0$ | $L_{12}=0$ | $L_{03}=0$ | $L_{20}=0$ | $L_{11}=0$ | $L_{02}=0$ | $L_{10}=0$ | $L_{01}=1$ | $L_{00}=0$ |
| LOCATION INFORMATION | last_siginificant_x | - | - | - | - | - | - | 3 | - | - | - | - | - | - | - | - | - |
| | last_siginificant_y | - | - | - | - | - | - | 0 | - | - | - | - | - | - | - | - | - |
| | siginificant_coeff_flag | - | - | - | - | - | - | - | 0 | 0 | 0 | 0 | 0 | 0 | 0 | 1 | 0 |
| VALUE INFORMATION | coeff_abs_level_greater1_flag | - | - | - | - | - | - | 0 | - | - | - | - | - | - | - | 0 | - |
| | coeff_abs_level_greater2_flag | - | - | - | - | - | - | - | - | - | - | - | - | - | - | - | - |
| | coeff_sign_flag | - | - | - | - | - | - | 0 | - | - | - | - | - | - | - | 0 | - |
| | coeff_abs_level_remaining | - | - | - | - | - | - | - | - | - | - | - | - | - | - | - | - |

FIG. 23

| | SYNTAX | Bin string | | | | | | | | | | | | | | | | | [bin NUMBER] |
|---|---|---|---|---|---|---|---|---|---|---|---|---|---|---|---|---|---|---|---|
| | | $L_{33}=0$ | $L_{32}=0$ | $L_{23}=0$ | $L_{31}=0$ | $L_{22}=0$ | $L_{13}=0$ | $L_{30}=1$ | $L_{21}=0$ | $L_{12}=0$ | $L_{03}=0$ | $L_{20}=0$ | $L_{11}=0$ | $L_{02}=0$ | $L_{10}=0$ | $L_{01}=1$ | $L_{00}=0$ | | |
| LOCATION INFORMATION | last_significant_x | - | - | - | - | - | - | 111 | - | - | - | - | - | - | - | - | - | 3 | 13 |
| | last_significant_y | - | - | - | - | - | - | - | - | - | - | - | - | - | - | 1 | - | 1 | |
| | significant_coeff_flag | - | - | - | - | - | - | - | 0 | 0 | 0 | 0 | 0 | 0 | 0 | 1 | 0 | 9 | |
| VALUE INFORMATION | coeff_abs_level_greater1_flag | - | - | - | - | - | - | 0 | - | - | - | - | - | - | - | 0 | - | 2 | 4 |
| | coeff_abs_level_greater2_flag | - | - | - | - | - | - | - | - | - | - | - | - | - | - | - | - | 0 | |
| | coeff_sign_flag | - | - | - | - | - | - | 0 | - | - | - | - | - | - | - | 0 | - | 2 | |
| | coeff_abs_level_remaining | - | - | - | - | - | - | - | - | - | - | - | - | - | - | - | - | 0 | |
| | | | | | | | | | | | | | | | | | TOTAL | 17 | |

VIDEO CODING DEVICE USING QUANTIZING AN ORTHOGONAL TRANSFORM COEFFICIENT

This application is a National Stage Entry of PCT/JP2013/007080 filed on Dec. 3, 2013, which claims priority from Japanese Patent Application 2012-285238 filed on Dec. 27, 2012, the contents of all of which are incorporated herein by reference, in their entirety.

TECHNICAL FIELD

The present invention relates to quantization technology for quantizing an orthogonal transform coefficient, for example, suitably applied to a video coding device using HEVC.

BACKGROUND ART

A video coding system based on a method described in Non-Patent Literature (NPL) 1 divides each frame of digitized video into coding tree units (CTUs), and each CTU is encoded in order of raster scanning. Each CTU is split into coding units (CUs) in a quadtree structure and encoded. Each CU is split into prediction units (PUs) and predicted. Further, a prediction error of each CU is split into transform units (TUs) in a quadtree structure and frequency-transformed.

The CU is a coding unit of intra prediction/inter-frame prediction. Intra prediction and inter-frame prediction will be described below.

Intra prediction is prediction from a reconstructed image of a frame to be encoded. NPL 1 defines 33 types of angular intra prediction depicted in FIG. 14 and the like. In angular intra prediction, a reconstructed pixel around a block to be encoded is extrapolated in any of 33 directions depicted in FIG. 14 to generate an intra prediction signal. Hereinafter, a CU using intra prediction is referred to as an intra CU.

Inter-frame prediction is prediction based on an image of a reconstructed frame (reference picture) different in display time from a frame to be encoded. Hereinafter, inter-frame prediction is also referred to as inter prediction. FIG. 15 is an explanatory diagram depicting an example of inter-frame prediction. A motion vector $MV=(mv_x, mv_y)$ indicates the amount of translation of a reconstructed image block of a reference picture relative to a block to be encoded. In inter prediction, an inter prediction signal is generated based on a reconstructed image block of a reference picture (using pixel interpolation if necessary). Hereinafter, a CU using inter prediction is referred to as an inter CU.

A frame encoded with only intra CUs is called an I frame (or an I picture). A frame encoded including inter CUs as well as intra CUs is called a P frame (or a P picture). A frame encoded including inter CUs for which not only one reference picture but two reference pictures are simultaneously used for inter prediction of a block is called a B frame (or a B picture).

Referring next to FIG. 16, the configuration and operation of a typical video coding device that receives each CU of each frame of digitized video as an input image and outputs a bitstream will be described.

The video coding device depicted in FIG. 16 includes a transformer 101, a quantizer 1020, an entropy encoder 103, an inverse transformer/inverse quantizer 104, a buffer 105, a predictor 106, and an estimator 107.

FIG. 17 is an explanatory diagram depicting an example of CTU partitioning of a frame t and an example of CU partitioning of the eighth CTU (CTU8) in the frame t when the spatial resolution of the frame is CIF (Common Intermediate Format) and the CTU size is 64. FIG. 18 is an explanatory diagram depicting a quadtree structure corresponding to the example of CU partitioning of CTU8.

FIG. 19 is an explanatory diagram depicting an example of TU partitioning of a CU. An example of TU partitioning of a CU for an intra prediction 2N×2N PU is depicted in the upper part. When the CU is an intra prediction CU, the root of the quadtree is placed in the PU, and a prediction error is expressed by the quadtree structure. An example of TU partitioning of a CU for inter prediction 2N×N PUs is depicted in the lower part. When the CU is an inter prediction CU, the root of the quadtree is placed in the CU, and a prediction error is expressed by the quadtree structure.

The estimator 107 determines, for each CTU, a CU quadtree structure, a PU partitioning shape, and a TU quadtree structure that minimize the entropy coding cost.

The predictor 106 generates a prediction signal for an input image signal of a CU based on the CU quadtree structure and the PU partitioning shape determined by the estimator 107. The prediction signal is generated based on the intra prediction or inter prediction mentioned above.

Based on the TU quadtree structure determined by the estimator 107, the transformer 101 frequency-transforms a prediction error image obtained by subtracting the prediction signal from the input image signal.

The quantizer 1020 quantizes the frequency-transformed prediction error image (orthogonal transform coefficient). Hereinafter, the quantized orthogonal transform coefficient is called a coefficient level. Further, a coefficient level having a non-zero value is called a significant coefficient level. As depicted in FIG. 20, the quantizer 1020 includes a coefficient level calculation unit 1201 which takes input of an orthogonal transform coefficient Kij and a quantization parameter QP, and outputs a coefficient level Lij.

The entropy encoder 103 entropy-encodes cu split flag indicative of the quadtree structure of a CTU, a prediction parameter, and a coefficient level.

The inverse transformer/inverse quantizer 104 inversely quantizes the coefficient level. The inverse transformer/inverse quantizer 104 further inversely frequency-transforms the inversely quantized orthogonal transform coefficient. The prediction signal is added to a reconstructed prediction error image obtained by the inverse transform, and supplied to the buffer 105. The buffer 105 stores the reconstructed image.

Based on the operation mentioned above, the typical video coding device generates a bitstream.

The operation of the quantizer 1020 and the entropy encoder 103 will be described below in further detail by using an example of 4×4 TU depicted in FIG. 21, respectively.

First, the orthogonal transform coefficient Kij and the coefficient level Lij of the 4×4 TU are defined as follows:

Kij ($0 \leq i, j \leq 3$) is defined as an value of the orthogonal transform coefficient in a horizontal position i and a vertical position j on a frequency axis. Similarly, the coefficient level Lij is defined as a value of the coefficient level corresponding to the orthogonal transform coefficient Kij. Note that Kij and Lij become higher frequency components as the values of i, j increase.

Next, quantization will be described in detail. The coefficient level calculation unit 1201 divides Kij by a quantization step Qs to calculate the coefficient level Lij. As a formula, the coefficient level Lij is represented by Equation (1).

$$Lij = \text{Sign}(Kij) \cdot \text{Floor}(|Kij|/Qs+f) \quad (1)$$

Note that Sign (a) is a function that returns the positive or negative sign of input a, Floor (a) is a function that returns the largest integer less than or equal to the input a, and f is a parameter ($0 \leq f \leq 0.5$) for determining quantization characteristics. The value of f is set to ⅙ in inter prediction and to ⅓ in intra prediction.

Qs is represented by Equation (2) below using a quantization parameter QP.

$$Qs = 2^{7+\frac{QP}{6}\log_2(N)-\frac{2}{3}} \quad (2)$$

Note that N denotes the block size of a TU. In the 4×4 TU depicted in FIG. 21, N=4. In FIG. 21, an example of quantizing Kij using Qs having a value of 4096 and f having a value of ⅓ is depicted.

Then, entropy coding will be described in detail. First, location information and value information used in describing entropy coding for a coefficient level will be defined.

In this specification, the location information is information indicating the locations of all significant coefficient levels of the TU.

Referring to the section 7.4.9.11 in NPL 1, the location information in HEVC is composed of information last_significant_x and last_significant_y indicating the horizontal position and the vertical position of a significant coefficient level to be first transmitted, and information significant_coeff_flag indicative of the presence or absence of a significant coefficient level in each of locations from a location subsequent to (last_significant_x, last_significant_y) up to (0, 0). Therefore, the number of location information bits is the sum of the number of last_significant_x bits, the number of last_significant_y bits, and the number of significant_coeff_flag bits determined based on the location of the significant coefficient level to be first transmitted.

In this specification, the value information is information indicative of the value of a significant coefficient level.

Referring to the section 7.4.9.11 in NPL 1, the value information in HEVC is composed of information coeff_abs_level_greater1_flag indicating whether the absolute value of a significant coefficient level is larger than 1, information coeff_abs_level_greater2_flag indicating whether the absolute value of the significant coefficient level is larger than 2, information coeff_sign_flag indicative of the positive or negative sign of the significant coefficient level, and information coeff_abs_level_remaining indicative of the absolute value of a value (remaining significant coefficient level) obtained by subtracting coeff_abs_level_greater1_flag and coeff_abs_level_greater2_flag from the absolute value of the significant coefficient level larger than coeff_abs_level_greater1_flag and coeff_abs_level_greater2_flag. Therefore, the number of value information bits is the sum of the number of coeff_abs_level_greater1_flag bits, the number of coeff_abs_level_greater2_flag bits, the number of coeff_sign_flag bits, and the number of coeff_abs_level_remaining bits of the significant coefficient level.

In FIG. 22, a relationship between the location information and the value information, and the coefficient level Lij is depicted. In FIG. 22, the vertical items relative to the horizontal ones indicate information on each Lij in the 4×4 TU depicted in FIG. 21.

The last_significant_x and the last_significant_y in FIG. 22 indicate a location (i, j)=(3, 0) of a significant coefficient level $L_{30}$=1 to be first transmitted. The significant_coeff_flag indicates the presence or absence of a significant coefficient level in each of locations from a location subsequent to (3, 0) up to (0, 0). In the case of a significant coefficient level, significant_coeff_flag=1, while in the case of an insignificant coefficient level, significant_coeff_flag=0. In FIG. 22, $L_{30}$=1 and $L_{01}$=1 are represented by coeff_abs_level_greater1_flag=0 and coeff_sign_flag=0 (positive), respectively. Since both values are smaller than 2, coeff_abs_level_greater2_flag and coeff_abs_level_remaining are not used.

In FIG. 23, a relationship between the location information and the value information, and the number of value information bits is depicted. In FIG. 23, the vertical items relative to the horizontal ones indicate the number of location information bits and the number of value information bits in the 4×4 TU depicted in FIG. 21.

The number of bits of each information in FIG. 23 is represented by a bin number. The term bin denotes one bit in an intermediate bit string before being transformed into a bitstream to be output by the entropy encoder 103.

In the case of the 4×4 TU depicted in FIG. 21, after transmitting 13bin as bits of the location information on all significant coefficient levels in the TU, the entropy encoder 103 transmits the number of value information bits of respective significant coefficient levels, i.e., a total of 4bin. The location information is composed of last_significant_x, last_significant_y, and significant_coeff_flag. The last_significant_x and the last_significant_y indicate (i, j)=(3, 0) as the location of a significant coefficient to be first transmitted, which is 4bin. The significant_coeff_flag indicates the presence or absence of a significant coefficient level in each of nine locations from a location (2, 1) subsequent to the location of the significant coefficient to be first transmitted up to (0, 0), which is 9bin.

The value information is composed of coeff_abs_level_greater1_flag, coeff_coeff_abs_level_greater2_flag, coeff_sign_flag, and coeff_abs_level_remaining. The coeff_abs_level_greater1_flag indicates whether $L_{30}$ and $L_{01}$ are larger than 1 respectively, which is 2bin. The coeff_coeff_abs_level_greater2_flag is 0bin because there exists no coefficient level with the absolute value of the significant coefficient level larger than 2. The coeff_sign_flag indicates the positive or negative signs of $L_{30}$ and $L_{01}$, which is 2bin. The coeff_abs_level_remaining is 0bin because there exists no coefficient level with the absolute value of the significant coefficient level larger than 2.

In the case of the 4×4 TU, the maximum bin number of each information is as follows: In other words, since the maximum value in the 4×4 TU is 3 (=N-1=4-1) based on the section 7.4.9.11 in NPL 1, the last_significant_x is up to 3bin. Similarly, the last_significant_y is also up to 3bin. The significant_coeff_flag is up to 15bin because of up to 15 per 4×4 TU based on the section 7.3.9.11 in NPL 1. The coeff_abs_level_greater1_flag is up to 8bin because of up to 8 per 4×4 TU based on the section 7.3.9.11 in NPL 1. The coeff_coeff_abs_level_greater2_flag is up to 1bin because of up to 1 per 4×4 TU based on the section 7.3.9.11 in NPL 1. The coeff_sign_flag is up to 16bin because of up to 16 per 4×4 TU based on the section 7.3.9.11 in NPL 1. Based on the section 9.2.2.8 in NPL 1, bin for coeff_abs_level_remaining is calculated.

As apparent from Equations (9-6) and (9-7) in the section 9.2.2.8 of NPL 1, high-dimensional TU code is applied to a bin string of the prefix part of coeff_abs_level_remaining each time the value of a significant coefficient level last transmitted exceeds a predetermined threshold value, and high-dimensional Exp-Golom code is applied to a bin string of the suffix part of coeff_abs_level_remaining. In other words, the bin number for the suffix part of coeff_abs_level_remaining having a small value becomes large, while the bin number for the suffix part of coeff_abs_level_remaining having a large value becomes small.

CITATION LIST

Non Patent Literature

NPL 1: High efficiency video coding (HEVC) text specification draft 9, JCTVC-K1003_v9, Joint Collaborative Team on Video Coding (JCT-VC) of ITU-T SG16 WP3 and ISO/IEC JTC1/SC29/WG11 11th Meeting: Shanghai, CN, 10209 October 2012.

SUMMARY OF INVENTION

Technical Problem

An entropy encoder using HEVC entropy-encodes location information on all significant coefficient levels in a TU, and then entropy-encodes value information on each of the significant coefficient levels in units of TUs. Therefore, when the number of location information bits and the number of value information bits of a significant coefficient level meet a predetermined condition, there exists a significant coefficient level whose cost is high upon transmission (hereinafter referred to as a high-cost coefficient level). For example, when the number of location information bits is larger than the number of value information bits, the coefficient level becomes a high-cost coefficient level. Further, when the value of a significant coefficient level is small, the coefficient level tends to be a high-cost coefficient level. When a high-cost coefficient level is transmitted, compression efficiency is reduced.

It is an object of the present invention to provide a video coding device which prevents the transmission of a high-cost coefficient level not to reduce compression efficiency.

Solution to Problem

A video coding device according to the present invention includes: orthogonal transform means for orthogonally transforming an image block to calculate an orthogonal transform coefficient; quantization means for quantizing the orthogonal transform coefficient to calculate a coefficient level; and entropy coding means for entropy-encoding location information on all significant coefficient levels among coefficient levels, and then entropy-encoding value information on each of the significant coefficient levels to output a bitstream, wherein the quantization means includes number of location information bits calculating means for calculating the number of bits of location information determined based on the location of a coefficient level to be significant first in order of transmission and included in the image block, number of value information bits calculating means for calculating the number of value information bits of a coefficient level to be significant, and high-cost coefficient level detection/removal means for setting a coefficient level to be significant in which the number of location information bits and the number of value information bits meet a predetermined condition to 0.

A video coding method according to the present invention includes: orthogonally transforming an image block to calculate an orthogonal transform coefficient; quantizing the orthogonal transform coefficient to calculate a coefficient level; and entropy-encoding location information on all significant coefficient levels among coefficient levels, and then entropy-encoding value information on each of the significant coefficient levels to output a bitstream, wherein upon calculating the coefficient level, the method includes calculating the number of bits of location information determined based on the location of a coefficient level to be significant first in order of transmission and included in the image block, calculating the number of value information bits of a coefficient level to be significant, and setting a coefficient level to be significant in which the number of location information bits and the number of value information bits meet a predetermined condition to 0.

A video coding program according to the present invention causes a computer to execute: a process of orthogonally transforming an image block to calculate an orthogonal transform coefficient; a process of quantizing the orthogonal transform coefficient to calculate a coefficient level; and a process of entropy-encoding location information on all significant coefficient levels among coefficient levels, and then entropy-encoding value information on each of the significant coefficient levels to output a bitstream, wherein in the process of calculating the coefficient level, the program causes the computer to execute a process of calculating the number of bits of location information determined based on the location of a coefficient level to be significant first in order of transmission and included in the image block, a process of calculating the number of value information bits of a coefficient level to be significant, and a process of setting a coefficient level to be significant in which the number of location information bits and the number of value information bits meet a predetermined condition to 0.

Advantageous Effect of Invention

According to the present invention, a high-cost coefficient level that causes a reduction in compression efficiency is detected and removed to prevent the transmission of the high-cost coefficient level in order to prevent the reduction in compression efficiency.

BRIEF DESCRIPTION OF DRAWINGS

FIG. 18 It depicts an explanatory diagram depicting a quadtree structure corresponding to the example of CU partitioning of CTU8.

FIG. 19 It depicts an explanatory diagram depicting an example of TU partitioning of a CU.

FIG. 22 It depicts an explanatory diagram depicting a relationship between location information and value information, and a coefficient level Lij.

FIG. 23 It depicts an explanatory diagram depicting a relationship between location information and value information, and the number of value information bits.

DESCRIPTION OF EMBODIMENTS

Exemplary Embodiment 1

Figure 1:
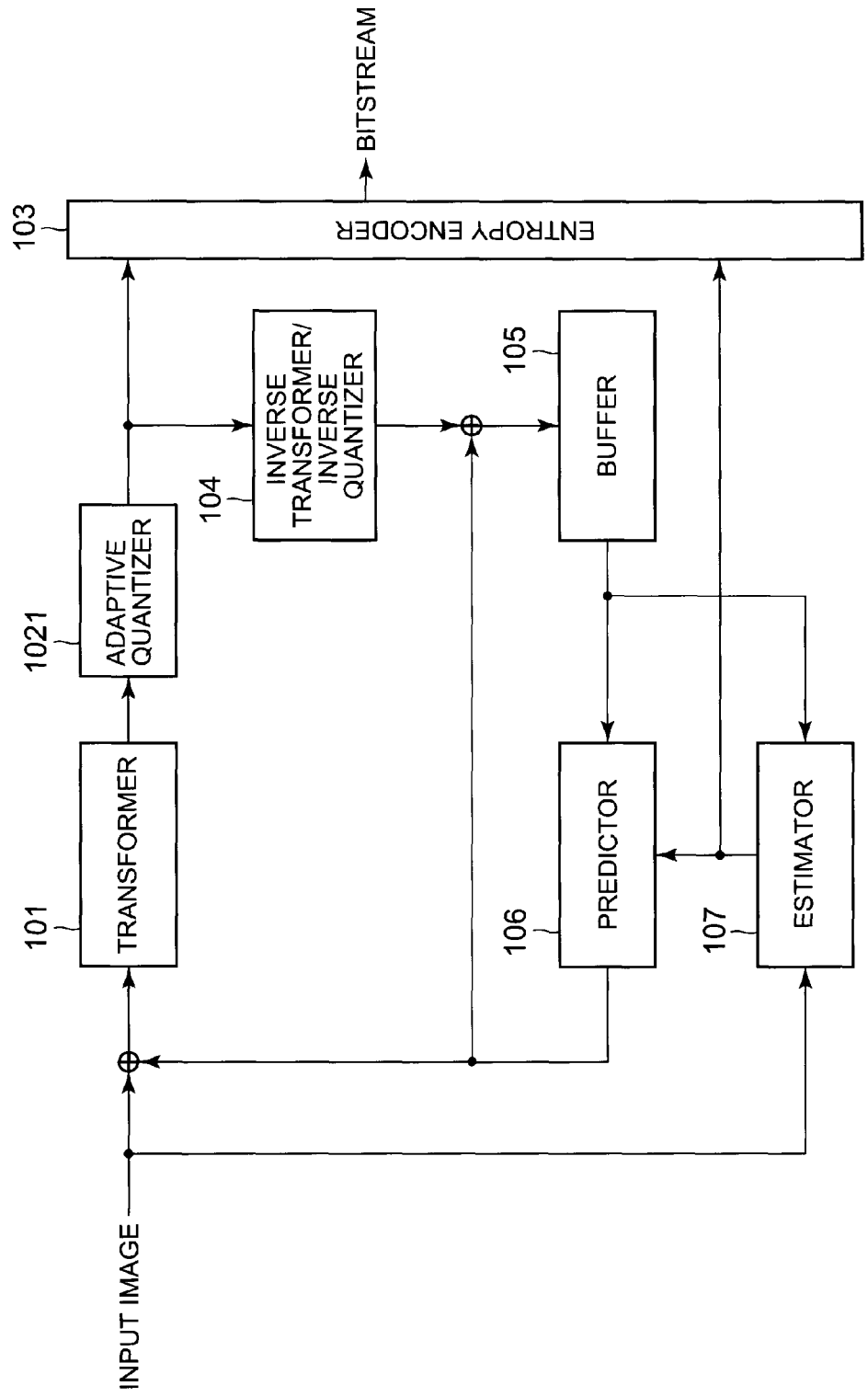
FIG. 1 It depicts a block diagram depicting a first exemplary embodiment of a video coding device according to the present invention.

FIG. 1 is a block diagram depicting a first exemplary embodiment of a video coding device according to the present invention. Referring to FIG. 1, the configuration of the first exemplary embodiment of the video coding device that receives each frame of digitized video as an input image and outputs a bitstream will be described.

Figure 16:
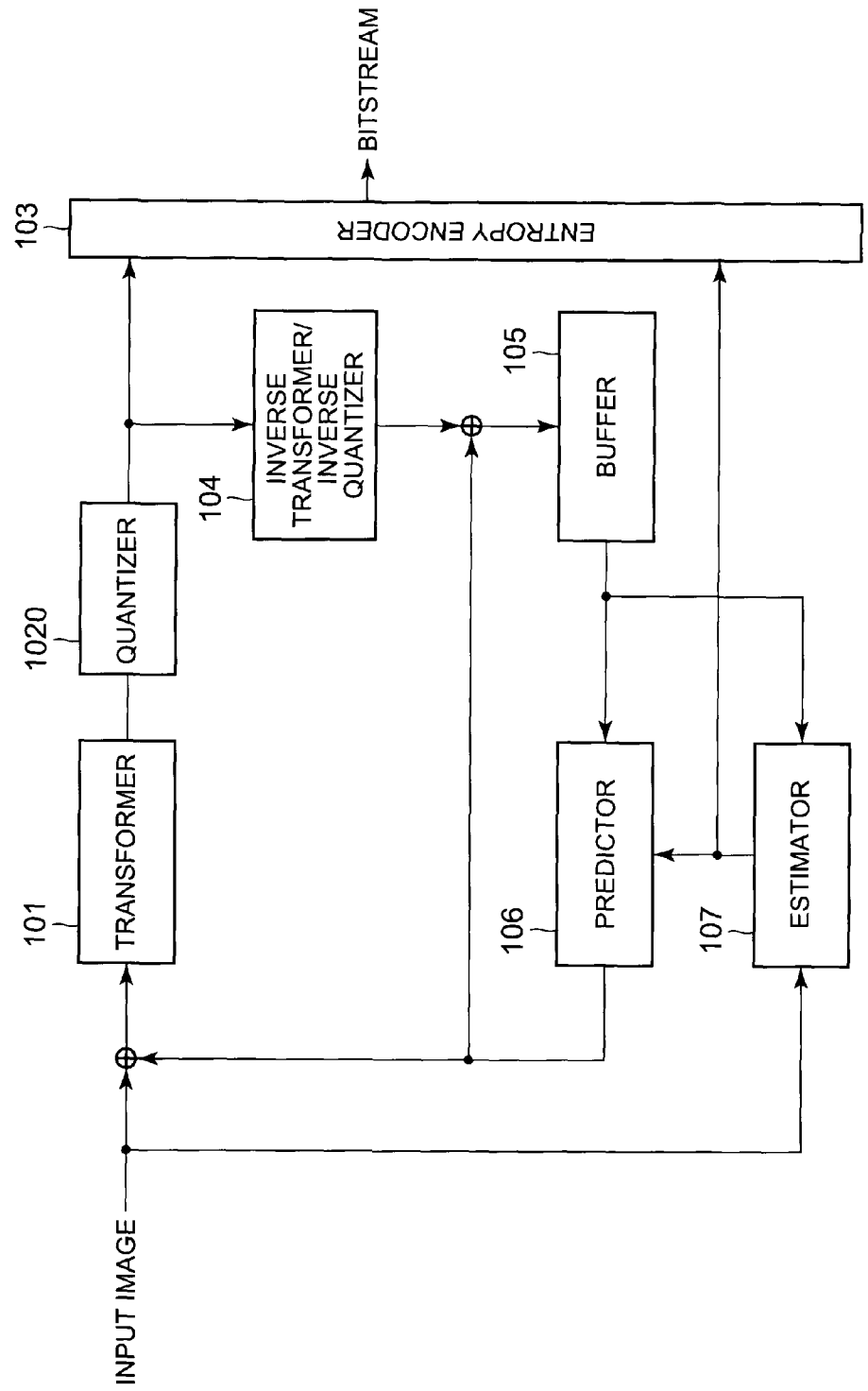
FIG. 16 It depicts an explanatory diagram depicting the configuration of a typical video coding device.
Figure 17:
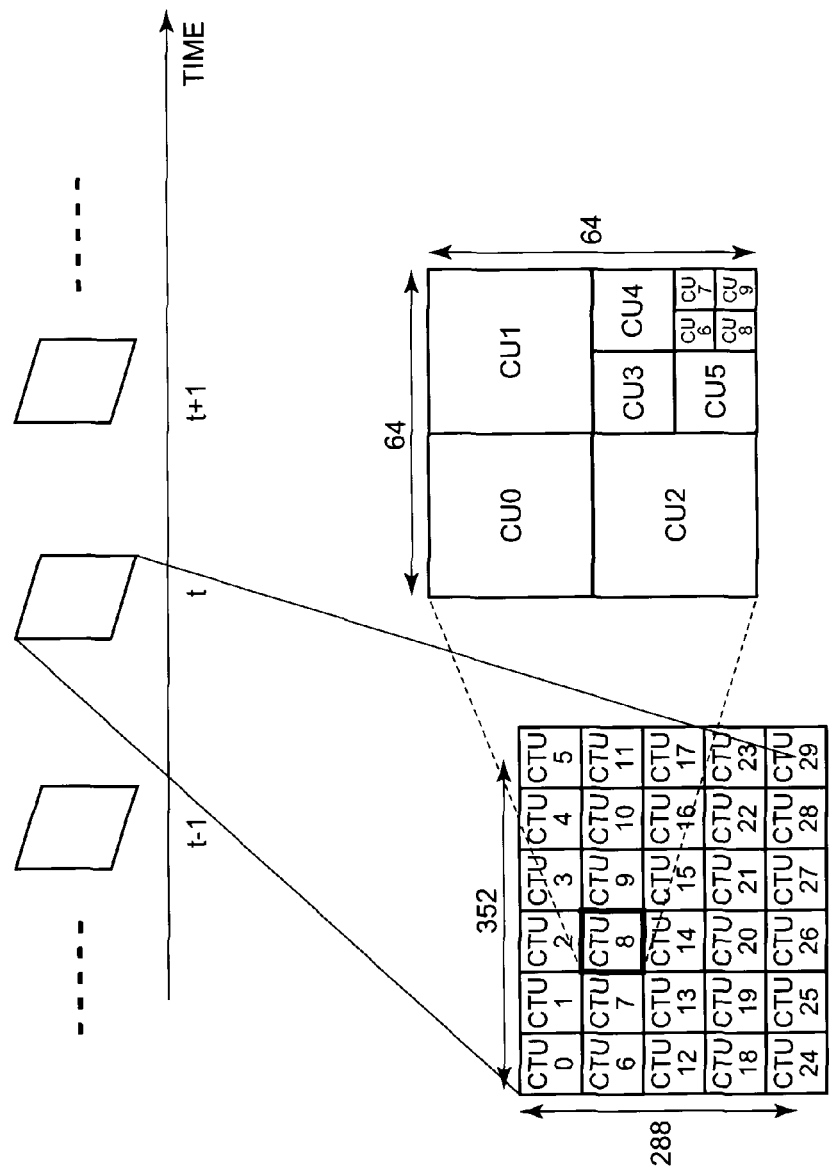
FIG. 17 It depicts an explanatory diagram depicting an example of CTU partitioning of a frame t, and an example of CU partitioning of CTU8 in the frame t.

The video coding device of the first exemplary embodiment depicted in FIG. 1 includes a transformer 101, an adaptive quantizer 1021, an entropy encoder 103, an inverse transformer/inverse quantizer 104, a buffer 105, a predictor 106, and an estimator 107. As compared with the video coding device depicted in FIG. 16, the adaptive quantizer 1021 is provided instead of the quantizer 1020. The other blocks in the video coding device depicted in FIG. 1 are the same as the blocks in the video coding device depicted in FIG. 16. For example, the entropy encoder 103 entropy-encodes location information on all significant coefficient levels in a TU, and then entropy-encodes value information on each significant coefficient level in units of TUs. Therefore, only the adaptive quantizer 1021 will be described below.

Figure 2:
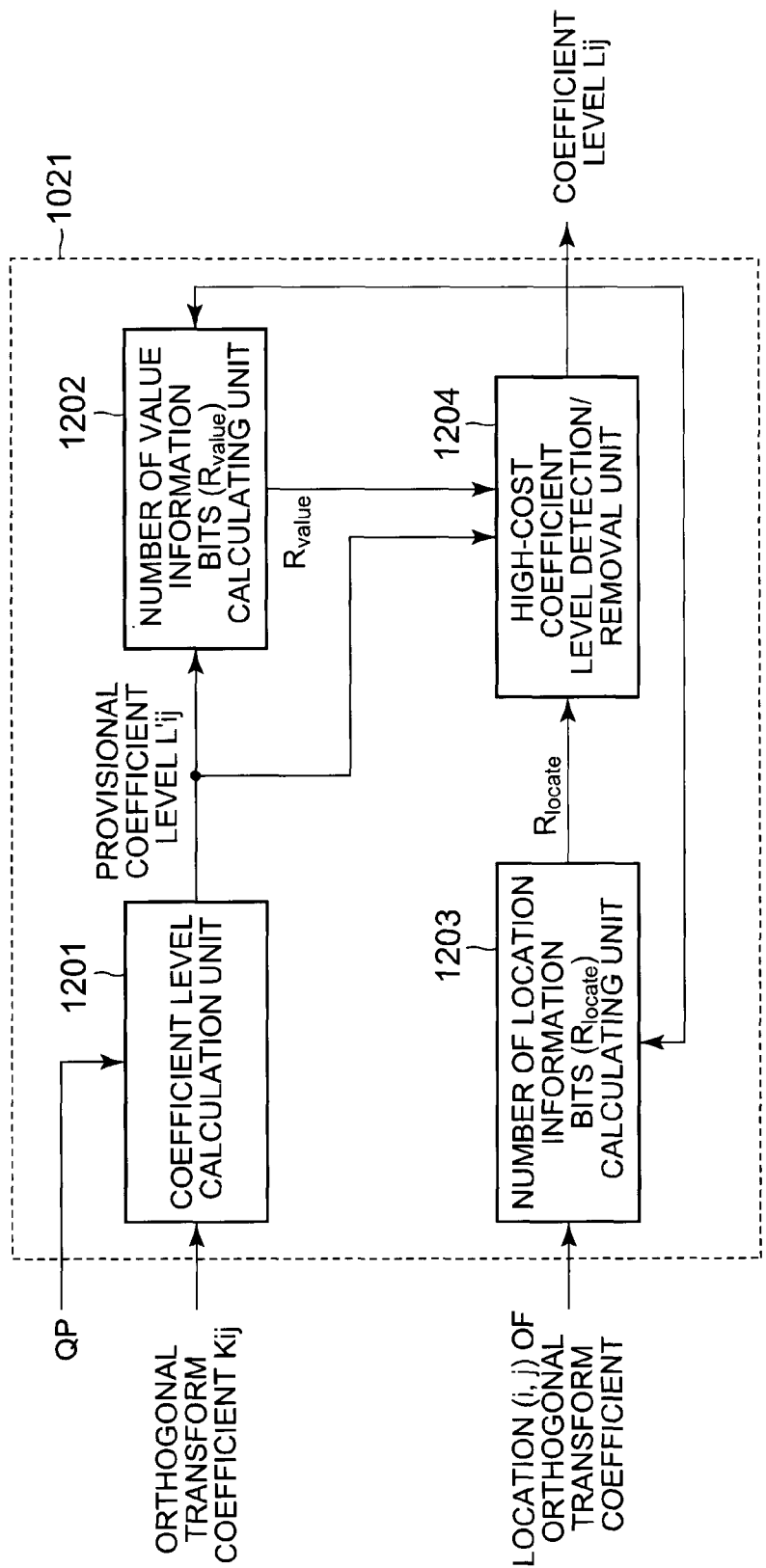
FIG. 2 It depicts a block diagram depicting the configuration of an adaptive quantizer in the first exemplary embodiment.
Figure 20:
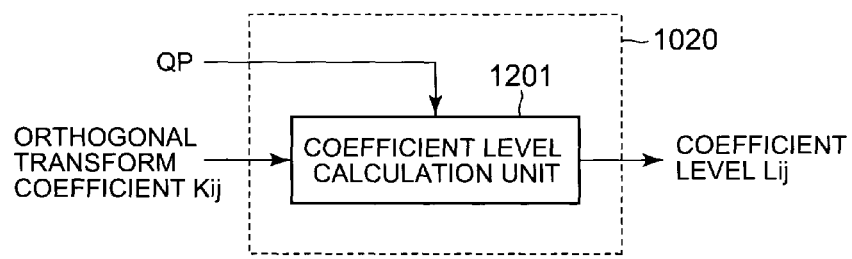
FIG. 20 It depicts a block diagram depicting the configuration of a typical adaptive quantizer.
Figure 21:
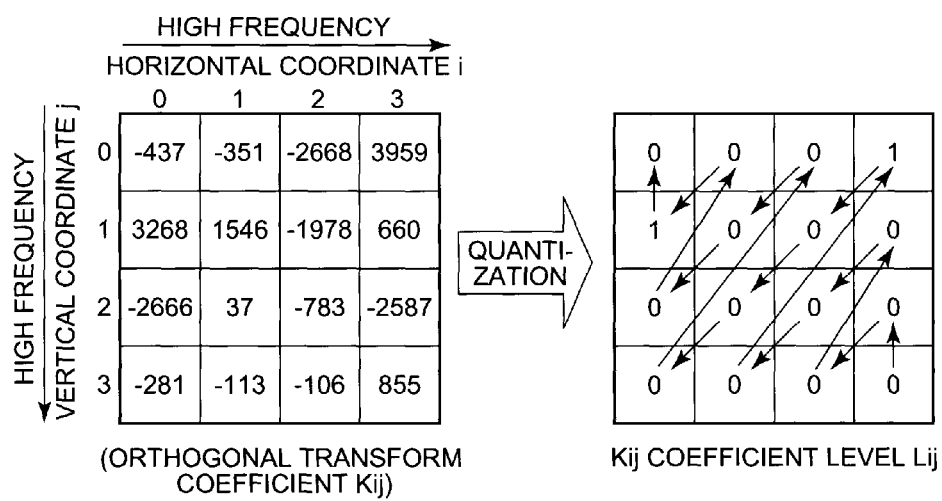
FIG. 21 It depicts an explanatory diagram depicting an example where Kij is quantized by Qs having a value of 4096 and a parameter f having a value of 1/6.

FIG. 2 is a block diagram depicting the configuration of the adaptive quantizer 1021. The adaptive quantizer depicted in FIG. 2 has a number of value information bits calculating unit ($R_{value}$ calculation unit) 1202, a number of location information bits calculating unit ($R_{locate}$ calculation unit) 1203, and a high-cost coefficient level detection/removal unit 1204 in addition to the coefficient level calculation unit 1201 of the quantizer depicted in FIG. 20.

The coefficient level calculation unit 1201 takes input of an orthogonal transform coefficient Kij and a quantization parameter QP, and outputs a provisional coefficient level L'ij.

The $R_{value}$ calculation unit 1202 takes input of the provisional coefficient level L'ij, and outputs an $R_{value}$ as the number of value information bits. The $R_{value}$ is the number of bits of information indicative of the value of L'ij. Specifically, the $R_{value}$ is the sum of the number of bits of information coeff_abs_level_greater1_flag indicating whether the absolute value of a significant coefficient level is larger than 1, the number of bits of information coeff_coeff_abs_level_greater2_flag indicating whether the absolute value of the significant coefficient level is larger than 2, the number of bits of information coeff_sign_flag indicative of the positive or negative sign of the significant coefficient level, and the number of bits of information coeff_abs_level_remaining indicative of the absolute value of a value obtained by subtracting coeff_abs_level_greater1_flag and coeff_abs_level_greater2_flag from the absolute value of the significant coefficient level calculated based on the description of the section 9.2.2.8 in NPL 1.

The $R_{locate}$ calculation unit 1203 takes input of a location (i, j) of an orthogonal transform coefficient, and outputs $R_{locate}$ as the number of location information bits. The $R_{locate}$ is the number of bits of information indicative of the locations of all significant coefficient levels of the TU on the frequency axis. Specifically, the $R_{locate}$ is the sum of the number of bits of information last_significant_x and last_significant_y, respectively indicating the horizontal position and the vertical position of a significant coefficient level to be first transmitted, and the number of bits of information significant_coeff_flag indicative of the presence or absence of a significant coefficient level in a location from a location subsequent to (last_significant_x, last_significant_y) up to (0, 0).

The high-cost coefficient level detection/removal unit 1204 takes input of L'ij, $R_{value}$, and $R_{locate}$, and outputs a coefficient level Lij. For example, when the $R_{locate}$ is larger than 0 and the $R_{locate}$ is larger than $R_{value}$, the high-cost coefficient level detection/removal unit 1204 detects L'ij as a high-cost coefficient level, and outputs the value of 0 as Lij. Otherwise, the provisional coefficient level L'ij is outputs as Lij. In other words, the high-cost coefficient level detection/removal unit 1204 detects and removes a high-cost coefficient level.

Figure 3:
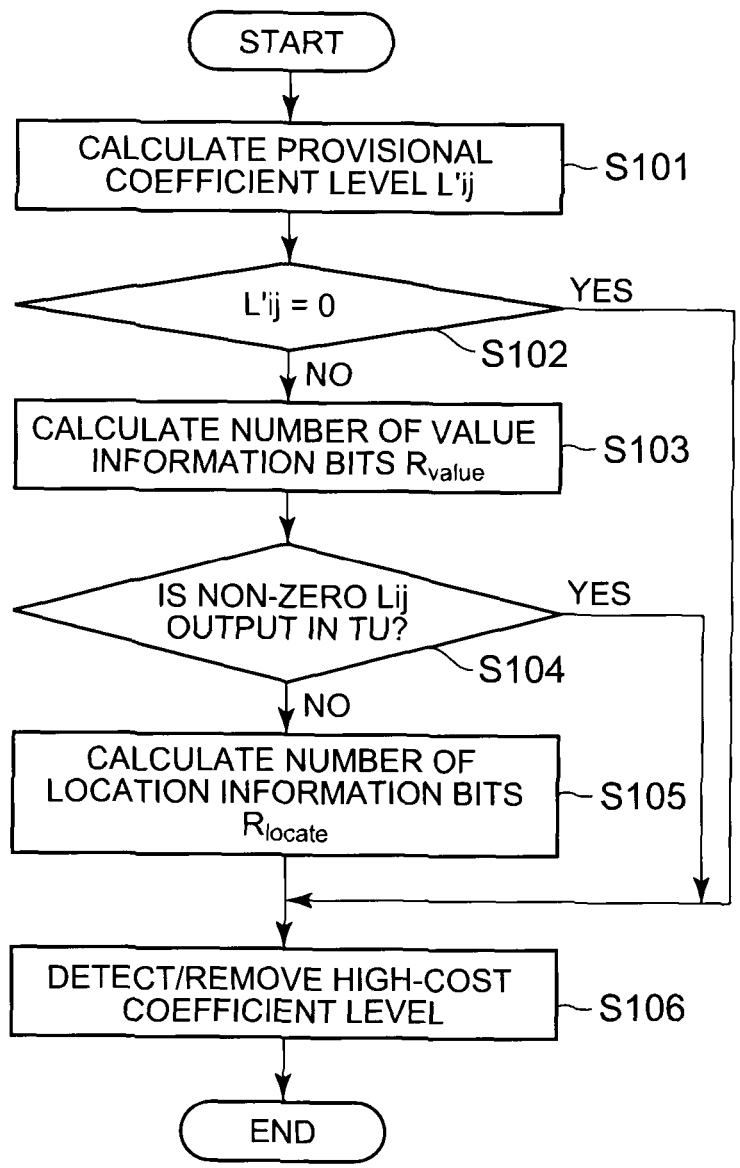
FIG. 3 It depicts a flowchart depicting the operation of the adaptive quantizer.

Referring next to a flowchart of FIG. 3, the operation of the adaptive quantizer 1021 will be described. The adaptive quantizer 1021 works on each orthogonal transform coefficient Kij (0≤i, j≤3) in a TU in order of transmission (the order of (3, 3)→(3, 2)→(2, 3)→(3, 1)→(2, 2)→(1, 3)→(3, 0)→(2, 1)→(1, 2)→(0, 3)→(2, 0)→(1, 1)→(0, 2)→(1, 0)→ (0, 1)→(0, 0)) for each TU as follows:

In step S101, the coefficient level calculation unit 1201 uses, for example, Equation (1) mentioned above to calculate a provisional coefficient level L'ij corresponding to an orthogonal transform coefficient Kij.

In step S102, when the value of L'ij is not 0, the procedure proceeds to step S103. When the value of L'ij is 0, the procedure proceeds to step S106.

In step S103, the $R_{value}$ calculation unit 1202 calculates the number of value information bits $R_{value}$ of L'ij.

In step S104, the $R_{locate}$ calculation unit 1203 determines whether non-zero Lij is already output in the TU. When non-zero Lij is not output in the TU yet, the procedure proceeds to step S105. When non-zero Lij has already been output in the TU, the value of $R_{locate}$ is set to 0, and the procedure proceeds to step S106.

In step S105, the $R_{locate}$ calculation unit 1203 calculates the number of location information bits $R_{locate}$ determined based on the location of L'ij.

When it is determined in step S102 that the value of L'ij is 0, the high-cost coefficient level detection/removal unit 1204 outputs a coefficient level Lij (=0) in step S106. Otherwise, when the $R_{locate}$ is larger than 0 and the $R_{locate}$ is larger than the $R_{value}$, the high-cost coefficient level detection/removal unit 1204 detects L'ij as a high-cost coefficient level, and outputs the value of 0 as Lij. Otherwise, L'ij is output as Lij.

As described above, in the adaptive quantizer 1021 in the exemplary embodiment, when the $R_{locate}$ is larger than 0 and the $R_{locate}$ is larger than the $R_{value}$, the high-cost coefficient level detection/removal unit 1204 detects L'ij as a high-cost coefficient level, and outputs the value of 0 as Lij so that the high-cost coefficient level will not be transmitted. Thus, the video coding device of the exemplary embodiment can prevent the transmission of the high-cost coefficient level not to reduce compression efficiency.

Exemplary Embodiment 2

Figure 4:
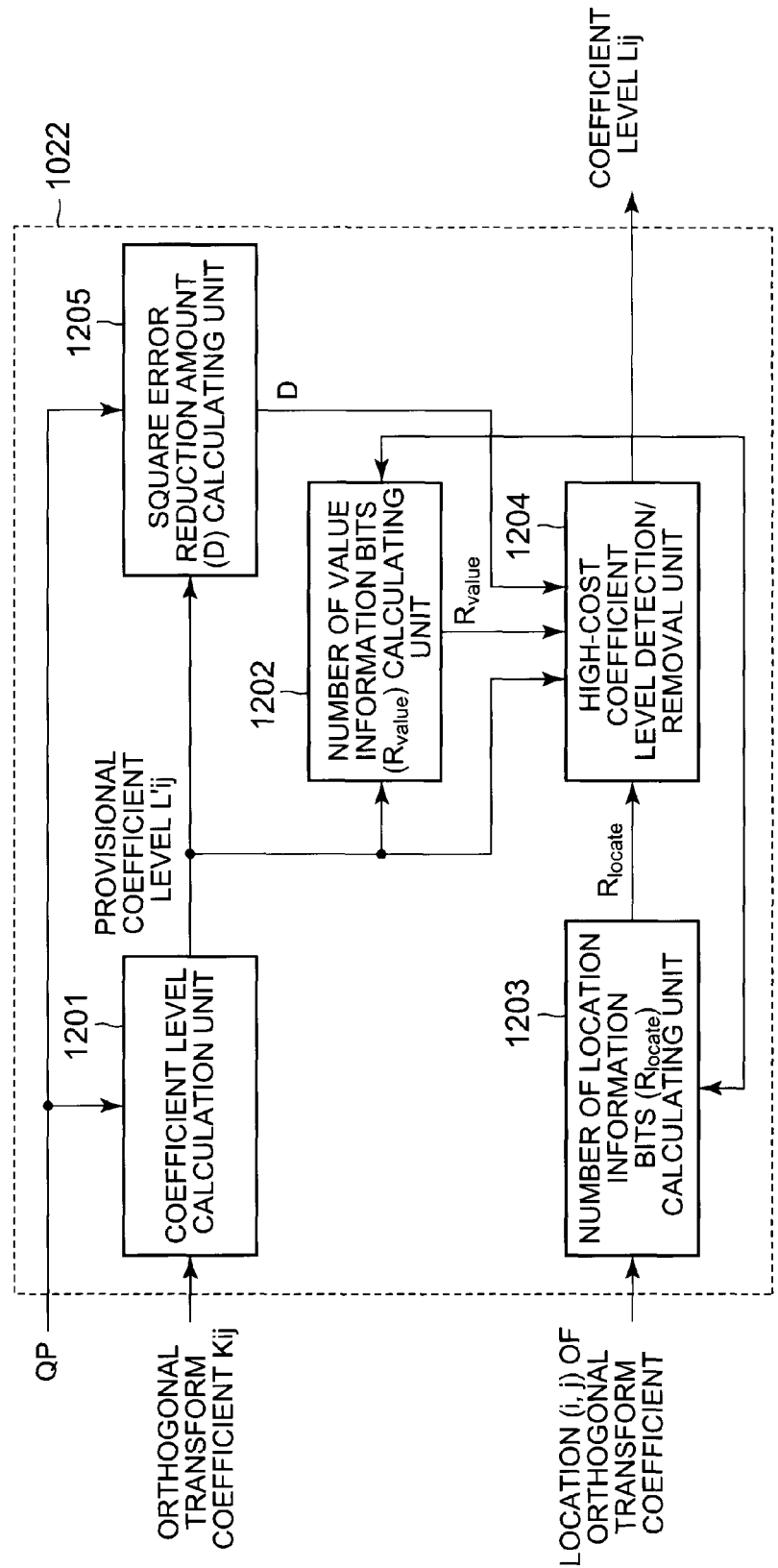
FIG. 4 It depicts a block diagram depicting the configuration of an adaptive quantizer in a second exemplary embodiment.

In the first exemplary embodiment mentioned above, there is a case where the high-cost coefficient level cannot be detected accurately. Therefore, an adaptive quantizer 1022 having a configuration depicted in FIG. 4 is used in a second exemplary embodiment in order to detect the high-cost coefficient level more accurately. Although the video coding device of the second exemplary embodiment is basically configured as depicted in FIG. 1, the adaptive quantizer 1022 is provided instead of the adaptive quantizer 1021.

The adaptive quantizer 1022 depicted in FIG. 4 has a coefficient level calculation unit 1201, a number of value information bits calculating unit ($R_{value}$ calculation unit) 1202, a number of location information bits calculating unit ($R_{locate}$ calculation unit) 1203, a high-cost coefficient level detection/removal unit 1204, and a square error reduction amount calculating unit (D calculation unit) 1205.

The coefficient level calculation unit 1201 takes input of an orthogonal transform coefficient Kij and a quantization parameter QP, and outputs a provisional coefficient level L'ij.

The D calculation unit 1205 takes input of the quantization parameter QP and L'ij, and outputs a square error reduction amount D. The square error reduction amount D is a square error reduction amount for Kij. In the exemplary embodiment, the D calculation unit 1205 uses a product of a value of the squire of the quantization step Qs and a value of the square of L'ij as depicted in Equation (3) below to calculate the square error reduction amount D.

$$D = Qs^2 \cdot (L'ij + \alpha)^2 - Qs^2 \cdot \alpha^2 = Qs^2 \cdot L'ij \cdot (L'ij + 2\alpha) \quad (3)$$

where $\alpha$ is a coefficient that meets $-f < \alpha < 1-f$.

The $R_{value}$ calculation unit 1202 takes input of L'ij, and outputs $R_{value}$ as the number of value information bits. The $R_{locate}$ calculation unit 1203 takes input of a location (i, j) of an orthogonal transform coefficient, and outputs $R_{locate}$ as the number of location information bits.

The high-cost coefficient level detection/removal unit 1204 takes input of L'ij, $R_{value}$, $R_{locate}$, and D, and outputs a coefficient level Lij. The high-cost coefficient level detection/removal unit 1204 uses a tilt $\lambda$ of D to the sum of $R_{locate}$ and $R_{value}$. Note that $\lambda$ denotes a gradient of the relationship between the square error reduction amount and the amount of transmission code. $\lambda$ is dependent on the quantization parameter QP to take a smaller value as the quantization parameter decreases (as the quantization step size decreases) or take a larger value as the quantization parameter increases (as the quantization step size increases). In the case of uniform quantization, $\lambda$ is represented by Equation (4) using Qs below.

$$\lambda = \frac{\ln 2}{6} \cdot Qs^2 \quad (4)$$

When the absolute value of L'ij is larger than 0, and a product of the sum of $R_{locate}$ and $R_{value}$, and $\lambda$ is larger than or equal to D, the high-cost coefficient level detection/removal unit 1204 determines L'ij to be a high-cost coefficient level, and outputs the value of 0 as Lij. When L'ij is not a high-cost coefficient level, L'ij is output as Lij.

Figure 5:
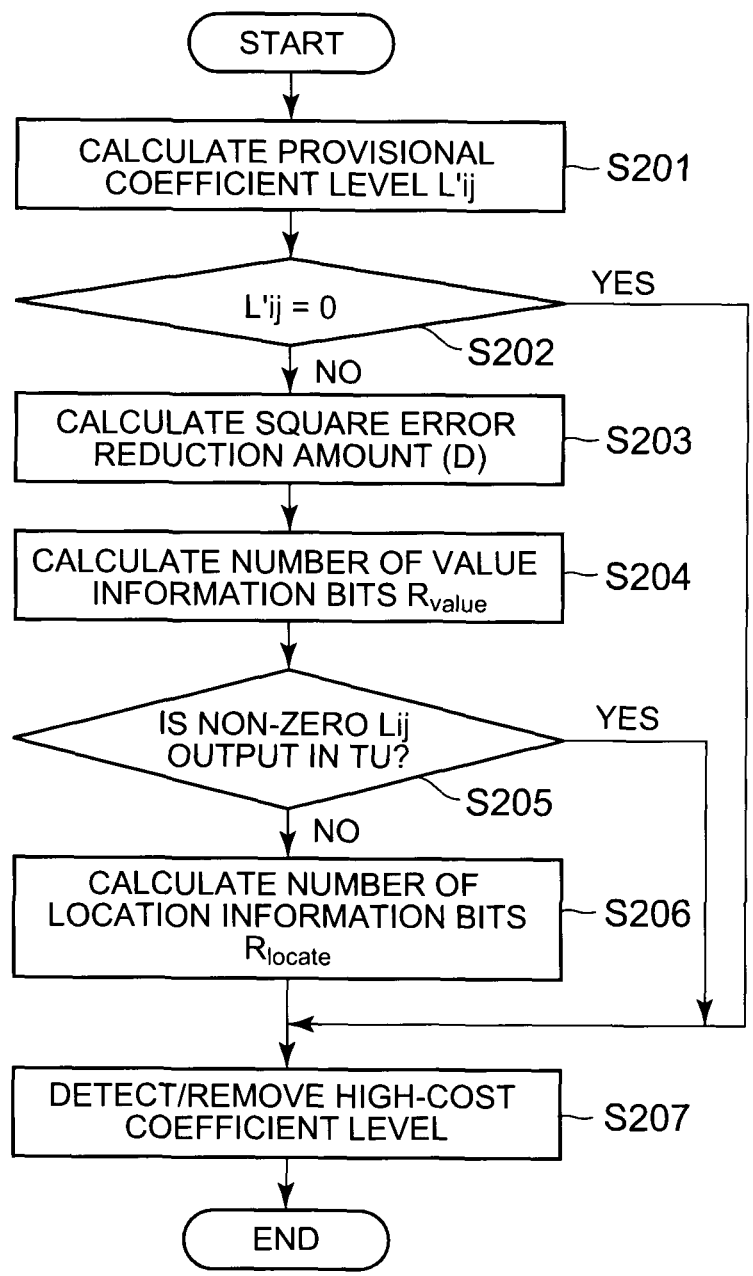
FIG. 5 It depicts a flowchart depicting the operation of the adaptive quantizer.

Referring next to a flowchart of FIG. 5, the operation of the adaptive quantizer 1022 will be described. The adaptive quantizer 1022 works on each orthogonal transform coefficient Kij (0≤i, j≤3) in a TU in order of transmission (the order of (3, 3)→(3, 2)→(2, 3)→(3, 1)→(2, 2)→(1, 3)→(3, 0)→(2, 1)→(1, 2)→(0, 3)→(2, 0)→(1, 1)→(0, 2)→(1, 0)→(0, 1)→(0, 0)) for each TU as follows:

In step S201, the coefficient level calculation unit 1201 uses, for example, Equation (1) mentioned above to calculate a provisional coefficient level L'ij corresponding to an orthogonal transform coefficient Kij.

In step S202, when the value of L'ij is not 0, the procedure proceeds to step S203. When the value of L'ij is 0, the procedure proceeds to step S207.

In step S203, the D calculation unit 1205 calculates D as a square error reduction amount for the orthogonal transform coefficient.

In step S204, the $R_{value}$ calculation unit 1202 calculates the number of value information bits $R_{value}$ of L'ij.

In step S205, the $R_{locate}$ calculation unit 1203 determines whether non-zero Lij is already output in the TU. When non-zero Lij is not output in the TU yet, the procedure proceeds to step S206. When non-zero Lij has already been output in the TU, the procedure proceeds to step S207 without calculating $R_{locate}$ (by setting the value of $R_{locate}$ to 0).

In step S206, the $R_{locate}$ calculation unit 1203 calculates the number of location information bits $R_{locate}$ determined based on the location of L'ij.

When it is determined in step S202 that the value of L'ij is 0, the high-cost coefficient level detection/removal unit 1204 outputs a coefficient level Lij (=0) in step S207. Otherwise, when a product of the sum of $R_{locate}$ and $R_{value}$, and $\lambda$ is larger than or equal to D, the high-cost coefficient level detection/removal unit 1204 determines L'ij to be a high-cost coefficient level, and outputs the value of 0 as Lij. When L'ij is not a high-cost coefficient level, L'ij is output as Lij.

The adaptive quantizer 1022 in the exemplary embodiment can use a square error reduction amount for Kij calculated by the square error reduction amount calculating unit (D calculation unit) 1205 to detect a high-cost coefficient level more accurately than the adaptive quantizer 1021 in the first exemplary embodiment. Thus, in the video coding device of the exemplary embodiment, the transmission of a high-cost coefficient level is prevented and hence the effect not to reduce compression efficiency is further increased.

Exemplary Embodiment 3

Figure 6:
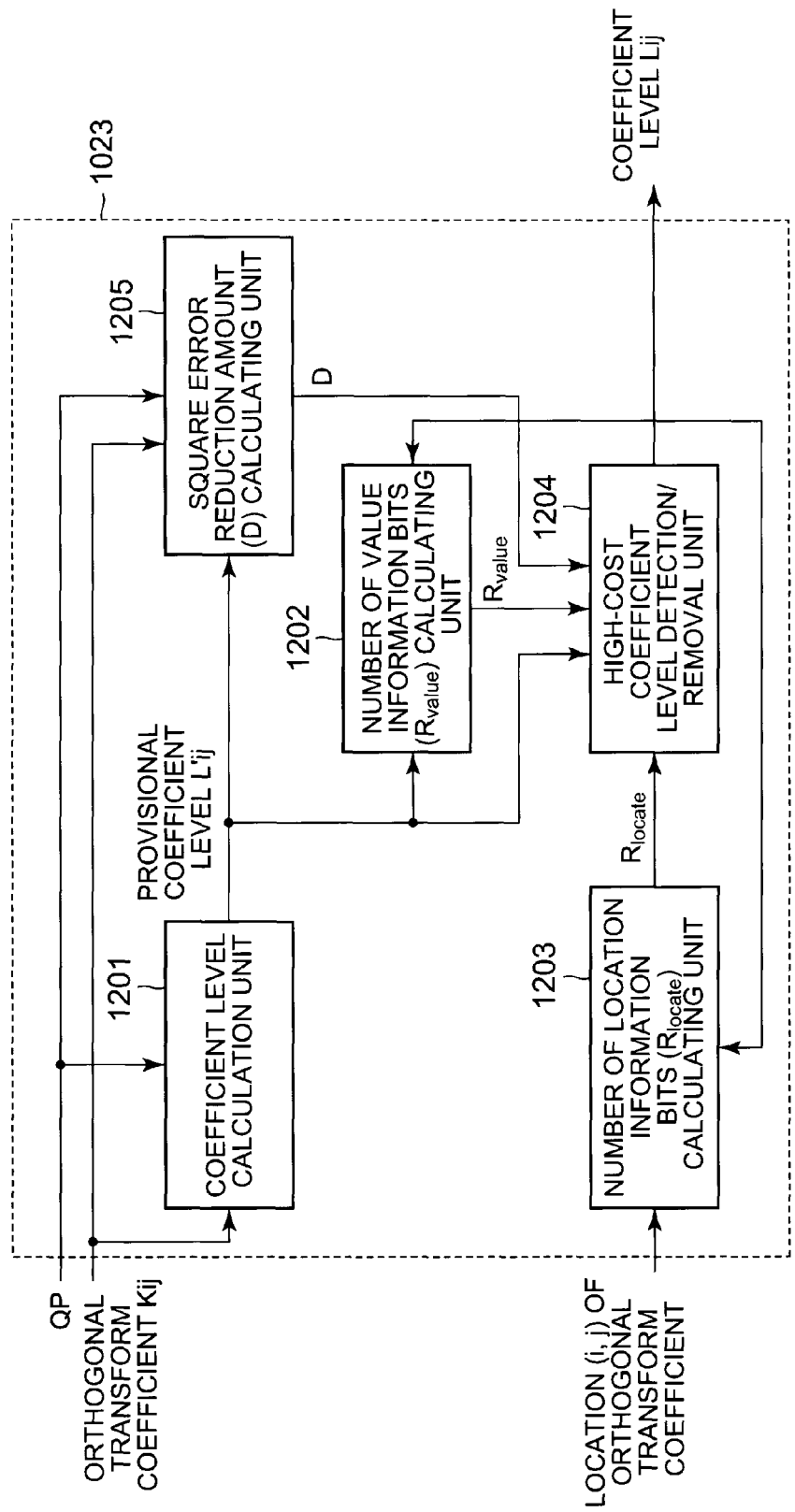
FIG. 6 It depicts a block diagram depicting the configuration of an adaptive quantizer in a third exemplary embodiment.

In the second exemplary embodiment, since the square error reduction amount is calculated without using Kij, there is a case where the high-cost coefficient level cannot be detected accurately. Therefore, an adaptive quantizer 1023 having a configuration depicted in FIG. 6 is used in a third exemplary embodiment in order to detect the high-cost coefficient level more accurately. Although the video coding device of the third exemplary embodiment is basically configured as depicted in FIG. 1, the adaptive quantizer 1023 is provided instead of the adaptive quantizer 1021.

The adaptive quantizer 1023 depicted in FIG. 6 has a coefficient level calculation unit 1201, a number of value information bits calculating unit ($R_{value}$ calculation unit) 1202, a number of location information bits calculating unit ($R_{locate}$ calculation unit) 1203, a high-cost coefficient level detection/removal unit 1204, and a square error reduction amount calculating unit (D calculation unit) 1205.

The coefficient level calculation unit 1201 takes input of an orthogonal transform coefficient Kij and a quantization parameter QP, calculates a provisional coefficient level L'ij using, for example, Equation (1) mentioned above, and outputs the provisional coefficient level L'ij.

In the exemplary embodiment, the D calculation unit 1205 takes input of the quantization parameter QP, L'ij, and Kij, and outputs a square error reduction amount D. The square error reduction amount D is a square error reduction amount for Kij. In the exemplary embodiment, the D calculation unit 1205 calculates D using Kij, Qs, and L'ij as depicted in Equation (5) below.

$$D=(Kij-0)^2-(Kij-Qs\cdot L'ij)^2=2\cdot Kij\cdot Qs\cdot L'ij-Qs^2\cdot L'ij^2 \quad (5)$$

The $R_{value}$ calculation unit 1202 takes input of L'ij, and outputs $R_{value}$ as the number of value information bits. The $R_{locate}$ calculation unit 1203 takes input of a location (i, j) of an orthogonal transform coefficient, and outputs $R_{locate}$ as the number of location information bits.

The high-cost coefficient level detection/removal unit 1204 takes input of L'ij, $R_{value}$, $R_{locate}$, and D, and outputs a coefficient level Lij. When the absolute value of L'ij is larger than 0, and a product of the sum of $R_{locate}$ and $R_{value}$, and λ is larger than or equal to D, the high-cost coefficient level detection/removal unit 1204 determines L'ij to be a high-cost coefficient level, and outputs the value of 0 as Lij. When L'ij is not a high-cost coefficient level, L'ij is output as Lij.

In the second exemplary embodiment, the D calculation unit 1205 calculates D using the quantization parameter QP and L'ij, whereas in this exemplary embodiment, the D calculation unit 1205 calculates D using Kij, Qs, and L'ij. The other processing steps are the same as those in the second exemplary embodiment.

The adaptive quantizer 1023 in the exemplary embodiment can use a square error reduction amount for Kij calculated by the D calculation unit 1205 that takes input of the quantization parameter QP, L'ij, and Kij to detect a high-cost coefficient level more accurately than the second exemplary embodiment. Thus, in the video coding device of the exemplary embodiment, the transmission of a high-cost coefficient level is prevented and hence the effect not to reduce compression efficiency is further increased.

Exemplary Embodiment 4

Figure 7:
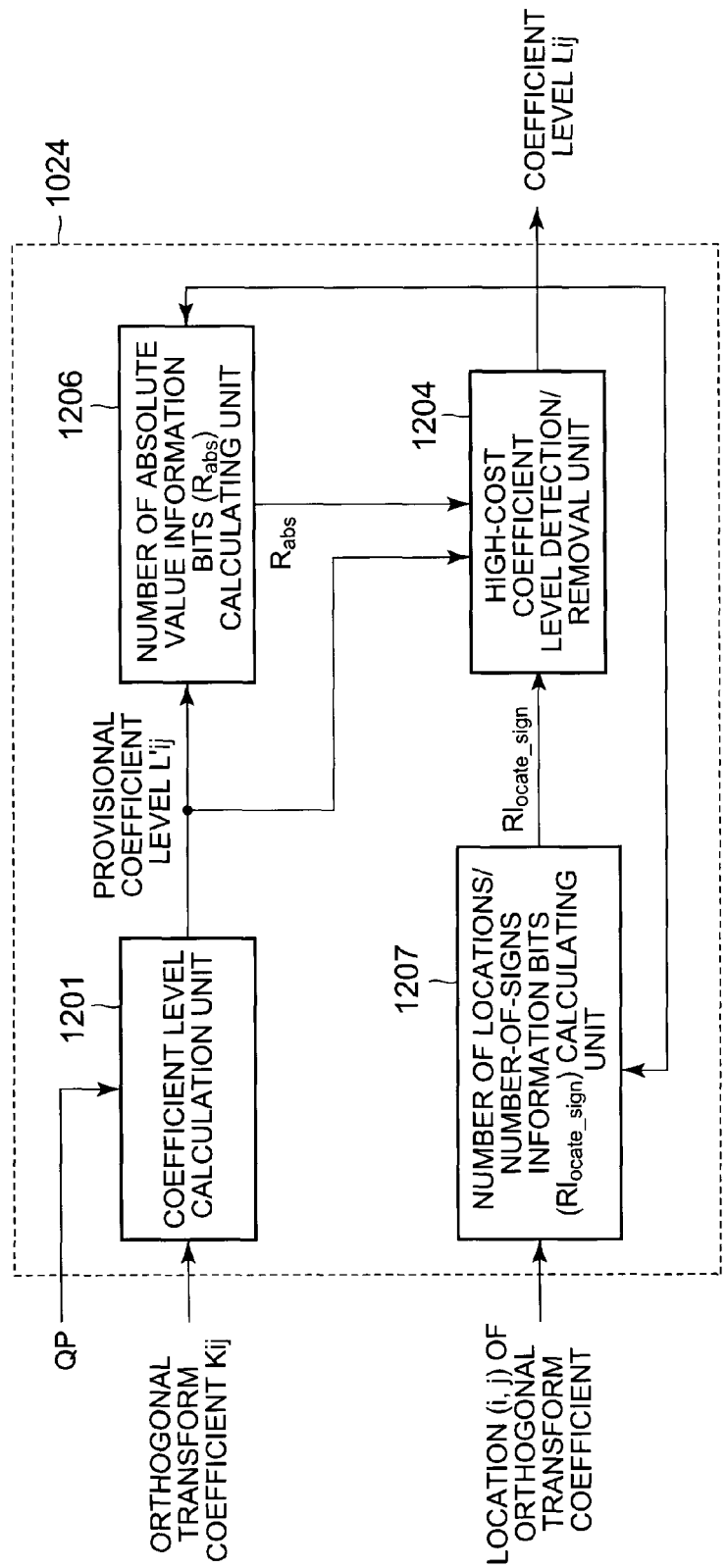
FIG. 7 It depicts a block diagram depicting the configuration of an adaptive quantizer in a fourth exemplary embodiment.

FIG. 7 is a block diagram depicting the configuration of an adaptive quantizer 1024 in a video coding device of a fourth exemplary embodiment. The adaptive quantizer 1024 includes, in the number of location information bits, the maximum number of bits of coeff_sign_flag determined from the location of a significant coefficient level to be first transmitted. Although the video coding device of the fourth exemplary embodiment is basically configured as depicted in FIG. 1, the adaptive quantizer 1024 is provided instead of the adaptive quantizer 1021.

Referring to FIG. 7, the configuration of the adaptive quantizer 1024 will be described. The adaptive quantizer 1024 depicted in FIG. 7 has a coefficient level calculation unit 1201, a number of absolute value information bits calculating unit ($R_{abs}$ calculation unit) 1206, a number of locations/number of signs information bits calculating unit ($R_{locate\_sign}$ calculation unit) 1207, and a high-cost coefficient level detection/removal unit 1204.

The coefficient level calculation unit 1201 takes input of an orthogonal transform coefficient Kij and a quantization parameter QP, and outputs a provisional coefficient level L'ij.

The $R_{abs}$ calculation unit 1206 takes input of L'ij, and outputs $R_{abs}$ as the number of absolute value information bits. $R_{abs}$ is the number of bits of information indicative of the absolute value of L'ij. Specifically, $R_{abs}$ is the sum of the number of bits of information coeff_abs_level_greater1_flag indicating whether the absolute value of a significant coefficient level is larger than 1, the number of bits of information coeff_coeff_abs_level_greater2_flag indicating whether the absolute value of the significant coefficient level is larger than 2, and the number of bits of information coeff_abs_level_remaining indicative of the absolute value of a value obtained by subtracting coeff_abs_level_greater1_flag and coeff_abs_level_greater2_flag from the absolute value of the significant coefficient level calculated based on the description of the section 9.2.2.8 in NPL 1.

The $R_{locate\_sign}$ calculation unit 1207 takes input of a location (i, j) of an orthogonal transform coefficient, and outputs $R_{locate\_sign}$ as the number of locations/number of signs information bits. $R_{locate\_sign}$ is the number of bits of information indicative of the locations of all significant coefficient levels in a TU on the frequency axis. Specifically, $R_{locate\_sign}$ is the sum of the number of bits of information last_significant_x and last_significant_y indicative of the horizontal position and the vertical position of a significant coefficient level to be first transmitted, the number of bits of information significant_coeff_flag indicative of the presence or absence of a significant coefficient level in a location from a location subsequent to (last_significant_x, last_significant_y) up to (0, 0), and the maximum number of bits of information coeff_sign_flag indicative of the positive or negative sign of the significant coefficient level.

The high-cost coefficient level detection/removal unit 1204 takes input of L'ij, $R_{abs}$, and $R_{locate\_sign}$, and outputs a coefficient level Lij. When $R_{locate\_sign}$ is larger than 0 and $R_{locate\_sign}$ is larger than $R_{abs}$, L'ij is detected as a high-cost coefficient level, and the value of 0 is output as Lij. Otherwise, the provisional coefficient level L'ij is output as Lij.

Figure 8:
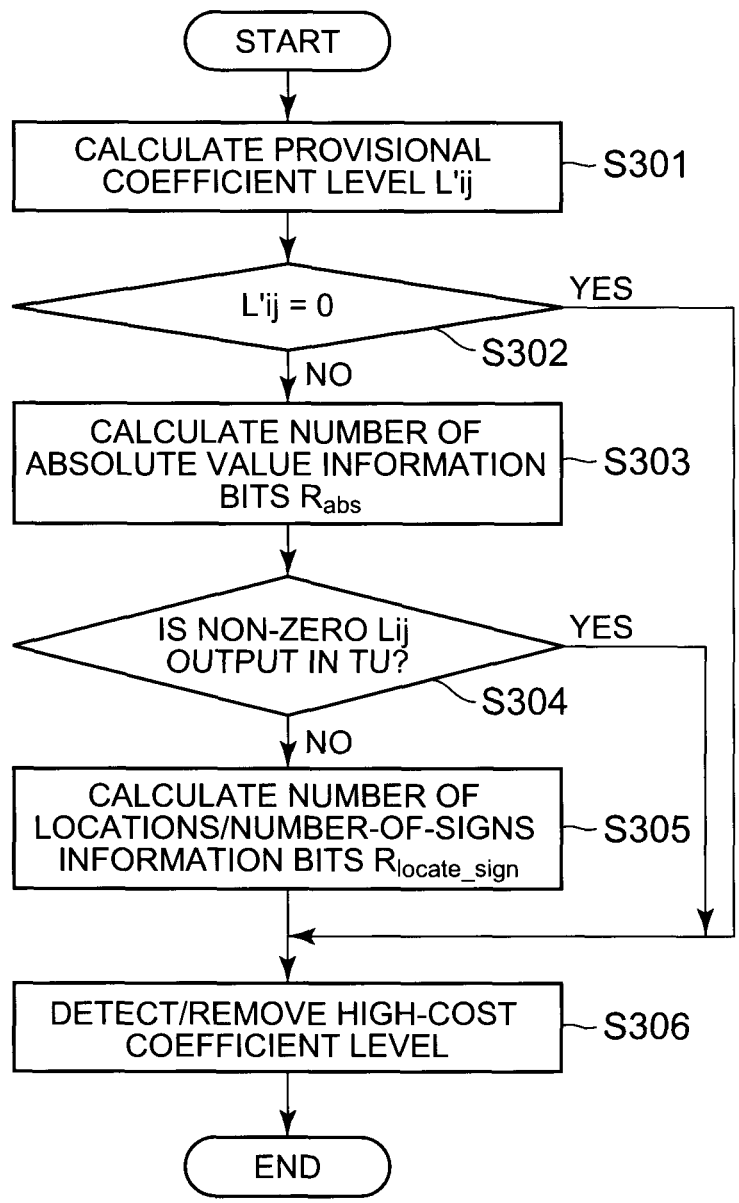
FIG. 8 It depicts a flowchart depicting the operation of the adaptive quantizer.

Referring next to a flowchart of FIG. 8, the operation of the adaptive quantizer 1024 will be described. The adaptive quantizer 1024 works on each orthogonal transform coefficient Kij (0≤i, j≤3) in a TU in order of transmission (the order of (3, 3)→(3, 2)→(2, 3)→(3, 1)→(2, 2)→(1, 3)→(3, 0)→(2, 1)→(1, 2)→(0, 3)→(2, 0)→(1, 1)→(0, 2)→(1, 0)→ (0, 1)→(0, 0)) for each TU as follows:

In step S301, the coefficient level calculation unit 1201 uses, for example, Equation (1) mentioned above to calculate a provisional coefficient level L'ij corresponding to an orthogonal transform coefficient Kij.

In step S302, when the value of L'ij is not 0, the procedure proceeds to step S303. When the value of L'ij is 0, the procedure proceeds to step S306.

In step S303, the $R_{abs}$ calculation unit 1206 calculates the number of bits $R_{abs}$ of absolute value information of L'ij.

In step S304, the $R_{locate\_sign}$ calculation unit 1207 determines whether non-zero Lij is already output in the TU. When non-zero Lij is not output in the TU yet, the procedure proceeds to step S305. When non-zero Lij has already been output in the TU, the value of $R_{locate\_sign}$ is set to 0, and the procedure proceeds to step S306.

In step S305, the $R_{locate\_sign}$ calculation unit 1207 calculates the number of bits $R_{locate\_sign}$ of locations/number of signs information determined based on the location of L'ij.

In step S306, when it is determined in step S302 that the value of L'ij is 0, the high-cost coefficient level detection/removal unit 1204 outputs a coefficient level Lij (=0). Otherwise, when $R_{locate\_sign}$ is larger than 0 and $R_{locate\_sign}$ is larger than $R_{abs}$, the high-cost coefficient level detection/removal unit 1204 detects L'ij as a high-cost coefficient level, and outputs the value of 0 as Lij. Otherwise, L'ij is output as Lij.

In the adaptive quantizer 1024 of the exemplary embodiment, when $R_{locate\_sign}$ is larger than 0 and $R_{locate\_sign}$ is larger than $R_{abs}$, since the high-cost coefficient level detection/removal unit 1204 detects L'ij as a high-cost coefficient level and outputs the value of 0 as Lij, the high-cost coefficient level is not transmitted. Thus, the video coding device of the exemplary embodiment can prevent the transmission of a high-cost coefficient level not to reduce compression efficiency.

Exemplary Embodiment 5

Figure 9:
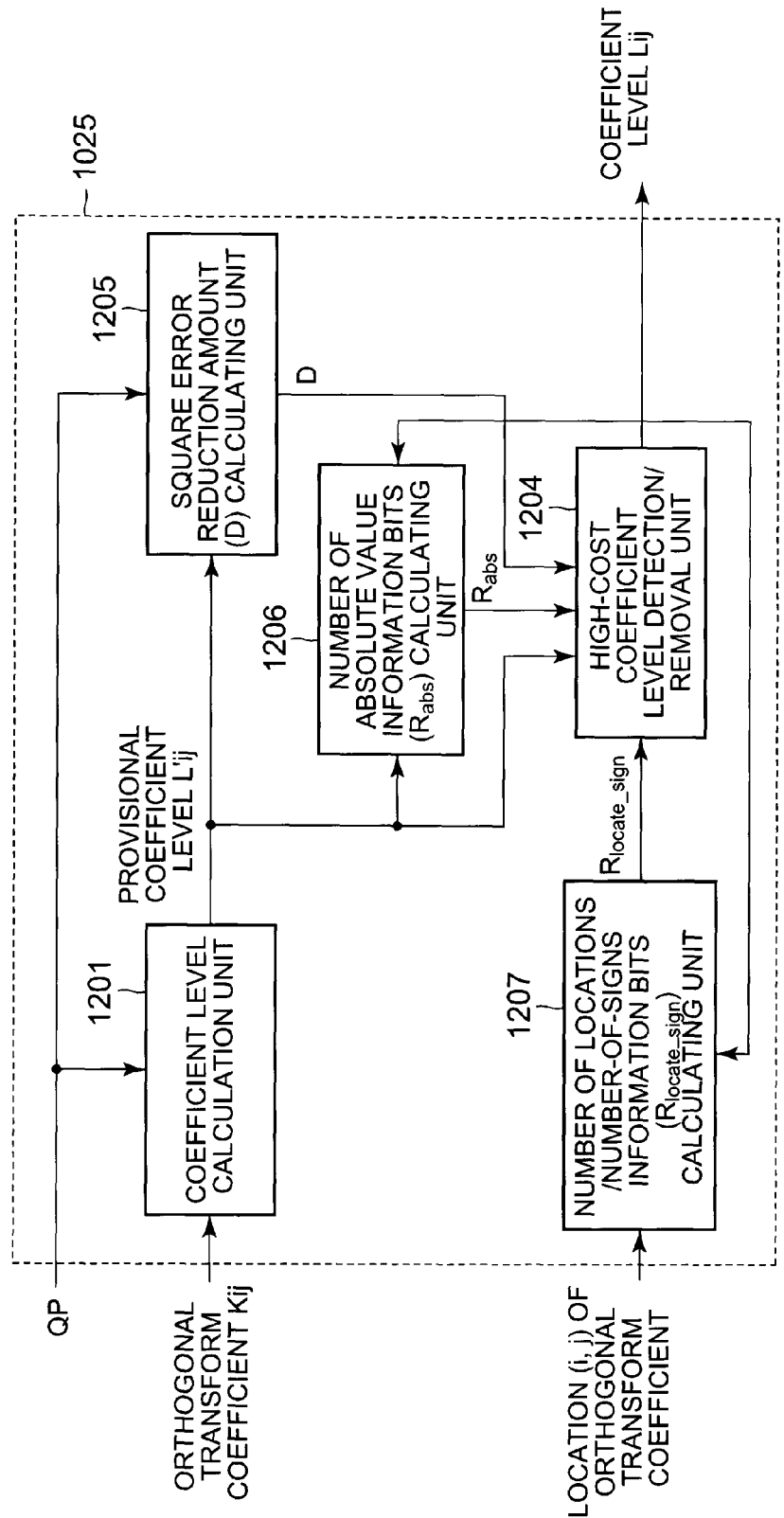
FIG. 9 It depicts a block diagram depicting the configuration of an adaptive quantizer in a fifth exemplary embodiment.

FIG. 9 is a block diagram depicting the configuration of an adaptive quantizer 1025 in a video coding device of a fifth exemplary embodiment. The adaptive quantizer 1025 includes, in the number of location information bits, the maximum number of bits of coeff_sign_flag determined from the location of a significant coefficient level to be first transmitted. Further, the adaptive quantizer 1025 uses a square error reduction amount for Kij calculated by a square error reduction amount calculating unit (D calculation unit) 1205. Although the video coding device of the fifth exemplary embodiment is basically configured as depicted in FIG. 1, the adaptive quantizer 1025 is provided instead of the adaptive quantizer 1021.

The adaptive quantizer 1025 depicted in FIG. 9 has a coefficient level calculation unit 1201, a number of absolute value information bits calculating unit ($R_{abs}$ calculation unit) 1206, a number of locations/number of signs information bits calculating unit ($R_{locate\_sign}$ calculation unit) 1207, a high-cost coefficient level detection/removal unit 1204, and a square error reduction amount calculating unit (D calculation unit) 1205.

The coefficient level calculation unit 1201 takes input of an orthogonal transform coefficient Kij and a quantization parameter QP, and outputs a provisional coefficient level L'ij.

The D calculation unit 1205 takes input of the quantization parameter QP and L'ij, and outputs D. D is a square error reduction amount for Kij. In the exemplary embodiment, a product of a value of the square of the quantization step Qs and a value of the square of L'ij is used as represented in Equation (3) mentioned above to calculate the square error reduction amount D.

The $R_{abs}$ calculation unit 1206 takes input of L'ij, and outputs $R_{abs}$ as the number of absolute value information bits. The $R_{locate\_sign}$ calculation unit 1207 takes input of a location (i, j) of an orthogonal transform coefficient, and outputs $R_{locate\_sign}$ as the number of locations/number of signs information bits.

The high-cost coefficient level detection/removal unit 1204 takes input of L'ij, $R_{abs}$, $R_{locate\_sign}$, and D, and outputs a coefficient level Lij. The high-cost coefficient level detection/removal unit 1204 uses a tilt λ of D to the sum of $R_{locate\_sign}$ and $R_{abs}$. In the case of uniform quantization, λ is represented by Equation (4) using Qs mentioned above.

When the absolute value of L'ij is larger than 0, and a product of the sum of $R_{locate}$ and $R_{value}$, and λ is larger than or equal to D, the high-cost coefficient level detection/removal unit 1204 determines L'ij to be a high-cost coefficient level, and outputs the value of 0 as Lij. When L'ij is not a high-cost coefficient level, L'ij is output as Lij.

Figure 10:
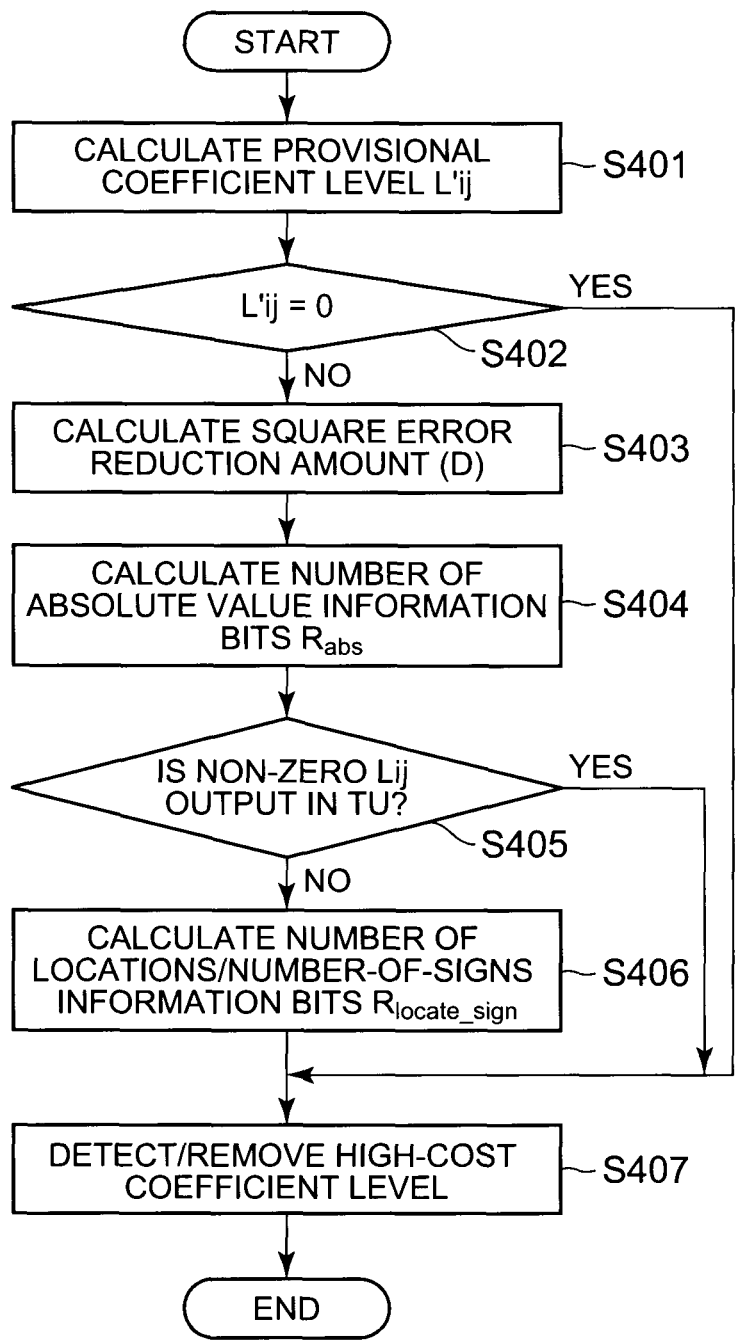
FIG. 10 It depicts a flowchart depicting the operation of the adaptive quantizer.

Referring next to a flowchart of FIG. 10, the operation of the adaptive quantizer 1025 will be described. The adaptive quantizer 1025 works on each orthogonal transform coefficient Kij (0≤i, j≤3) in a TU in order of transmission (the order of (3, 3)→(3, 2)→(2, 3)→(3, 1)→(2, 2)→(1, 3)→(3, 0)→(2, 1)→(1, 2)→(0, 3)→(2, 0)→(1, 1)→(0, 2)→(1, 0)→ (0, 1)→(0, 0)) for each TU as follows:

In step S401, the coefficient level calculation unit 1201 uses, for example, Equation (1) mentioned above to calculate a provisional coefficient level L'ij corresponding to an orthogonal transform coefficient Kij.

In step S402, when the value of L'ij is not 0, the procedure proceeds to step S403. When the value of L'ij is 0, the procedure proceeds to step S407.

In step S403, the D calculation unit 1205 calculates D as a square error reduction amount for the orthogonal transform coefficient.

In step S404, the $R_{abs}$ calculation unit 1206 calculates the number of bits $R_{abs}$ of absolute value information of L'ij.

In step S405, the $R_{locate\_sign}$ calculation unit 1207 determines whether non-zero Lij is already output in the TU. When non-zero Lij is not output in the TU yet, the procedure proceeds to step S406. When non-zero Lij has already been output in the TU, the procedure proceeds to step S407 without calculating $R_{locate\_sign}$ (by setting the value of $R_{locate\_sign}$ to 0).

In step S406, the $R_{locate\_sign}$ calculation unit 1207 calculates the number of bits $R_{locate\_sign}$ of locations/number of signs information determined based on the location of L'ij.

When it is determined in step S402 that the value of L'ij is 0, the high-cost coefficient level detection/removal unit 1204 outputs a coefficient level Lij (=0) in S407. Otherwise, when a product of the sum of $R_{locate\_sign}$ and $R_{abs}$, and λ is larger than or equal to D, the high-cost coefficient level detection/removal unit 1204 determines L'ij to be a high-cost coefficient level, and outputs the value of 0 as Lij. When L'ij is not a high-cost coefficient level, the high-cost coefficient level detection/removal unit 1204 outputs L'ij as Lij.

Exemplary Embodiment 6

Figure 11:
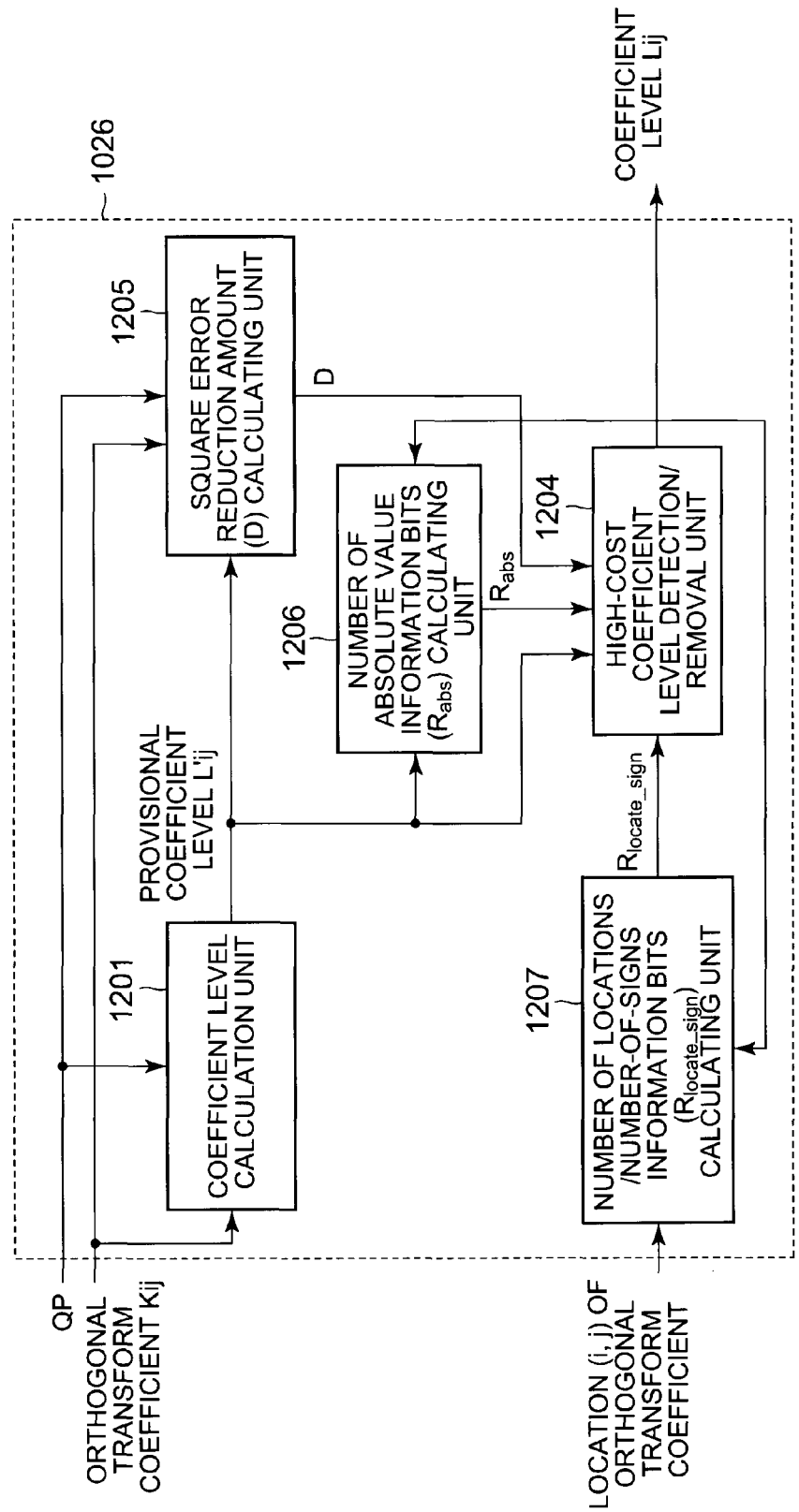
FIG. 11 It depicts a block diagram depicting the configuration of an adaptive quantizer in a sixth exemplary embodiment.

FIG. 11 is a block diagram depicting the configuration of an adaptive quantizer 1026 in a video coding device of a sixth exemplary embodiment. The adaptive quantizer 1026 includes, in the number of location information bits, the maximum number of bits of coeff_sign_flag determined from the location of a significant coefficient level to be first transmitted. Further, the adaptive quantizer 1026 uses a square error reduction amount for Kij. Although the video coding device of the sixth exemplary embodiment is basically configured as depicted in FIG. 1, the adaptive quantizer 1026 is provided instead of the adaptive quantizer 1021.

The adaptive quantizer 1026 depicted in FIG. 11 has a coefficient level calculation unit 1201, a number of absolute value information bits calculating unit ($R_{abs}$ calculation unit) 1206, a number of locations/number of signs information bits calculating unit ($R_{locate\_sign}$ calculation unit) 1207, a high-cost coefficient level detection/removal unit 1204, and a square error reduction amount calculating unit (D calculation unit) 1205.

The coefficient level calculation unit 1201 takes input of an orthogonal transform coefficient Kij and a quantization parameter QP, calculates a provisional coefficient level L'ij using, for example, Equation (1) mentioned above, and outputs the provisional coefficient level L'ij.

The D calculation unit 1205 takes input of the quantization parameter QP, L'ij, and Kij, and outputs D. D is a square error reduction amount for Kij. In the exemplary embodiment, the D calculation unit 1205 calculates D using Kij, Qs, and L'ij as represented in Equation (5) mentioned above.

The $R_{abs}$ calculation unit 1206 takes input of L'ij, and outputs $R_{abs}$ as the number of absolute value information bits.

The $R_{locate\_sign}$ calculation unit 1207 takes input of a location (i, j) of an orthogonal transform coefficient, and outputs $R_{locate\_sign}$ as the number of locations/number of signs information bits.

The high-cost coefficient level detection/removal unit 1204 takes input of L'ij, $R_{abs}$, $R_{locate\_sign}$, and D, and outputs a coefficient level Lij. When the absolute value of L'ij is larger than 0, and a product of the sum of $R_{locate\_sign}$ and $R_{abs}$, and λ is larger than or equal to D, L'ij is determined to be a high-cost coefficient level, and the value of 0 is output as Lij. When L'ij is not a high-cost coefficient level, the high-cost coefficient level detection/removal unit 1204 outputs L'ij as Lij.

In the fifth exemplary embodiment, the D calculation unit 1205 calculates D using the quantization parameter QP and L'ij, whereas in this exemplary embodiment, the D calculation unit 1205 calculates D using Kij, Qs, and L'ij. The other processing steps are the same as those in the fifth exemplary embodiment.

In each of the aforementioned exemplary embodiments, the detection and removal of high-cost coefficient levels are applied to all non-zero provisional coefficient levels L'ij. However, the detection and removal of high-cost coefficient levels in each of the aforementioned exemplary embodiments may be applied to only non-zero provisional coefficient levels L'ij less than or equal to a certain threshold value to reduce the calculation amount by paying attention to the fact that the provisional coefficient levels L'ij having absolute values larger than the certain threshold value (any given value, e.g., 2, varying with the quantization parameter QP or the nature of video) do not become high-cost coefficient levels.

When the above detection and removal of high-cost coefficient levels are applied to only non-zero provisional coefficient levels L'ij less than or equal to a certain threshold value, the number of bits of coeff_abs_level_remaining of each of non-zero provisional coefficient levels L'ij less than or equal to the threshold value may be set as a value obtained by subtracting the value of coeff_abs_level_greater1_flag and the value of coeff_abs_level_greater2_flag from the absolute value of L'ij to reduce the calculation amount by paying attention to the fact the number of bits of coeff_abs_level_remaining of the provisional coefficient level L'ij having an absolute value smaller than or equal to the threshold value (e.g., 2) is represented only by TU code in the prefix part.

In each of the aforementioned exemplary embodiments, the adaptive quantizer applies the above detection and removal of high-cost coefficient levels to all orthogonal transform coefficients, but the adaptive quantizer may apply the above detection and removal of high-cost coefficient levels to only orthogonal transform coefficients subjected to inter prediction to reduce the calculation amount by paying attention to the fact that high-cost coefficient levels are hardly generated in the orthogonal transform coefficients subjected to the intra prediction.

In each of the aforementioned exemplary embodiments, the orthogonal transform coefficient is a prediction error image obtained by transforming the orthogonal transform coefficient, but the adaptive quantizer of the present invention may also be applied to a prediction error image with a value of transform_skip_flag set to 1 as indicated in the section 7.3.9.11 Residual coding syntax of NPL 1, i.e., to which transform based on an identity matrix in the 4×4 TU instead of frequency transform is applied.

In each of the aforementioned exemplary embodiments, the location information is information (the sum of the numbers of bits of last_significant_x, last_significant_y, and significant_coeff_flag) indicative of the locations of all significant coefficient levels in the TU, but the number of bits of coded_sub_block_flag may also be added in addition to the location information in TUs larger than 4×4 (8×8 TU, 16×16 TU, and 32×32 TU), where coded_sub_block_flag indicates the presence or absence of a significant coefficient level in a 4×4 sub-block having 16 coefficient levels defined based on the description of the section 7.3.9.11 Residual coding syntax in NPL 1.

Each of the aforementioned exemplary embodiments can be configured in hardware, but can also be implemented by a computer program.

Figure 12:
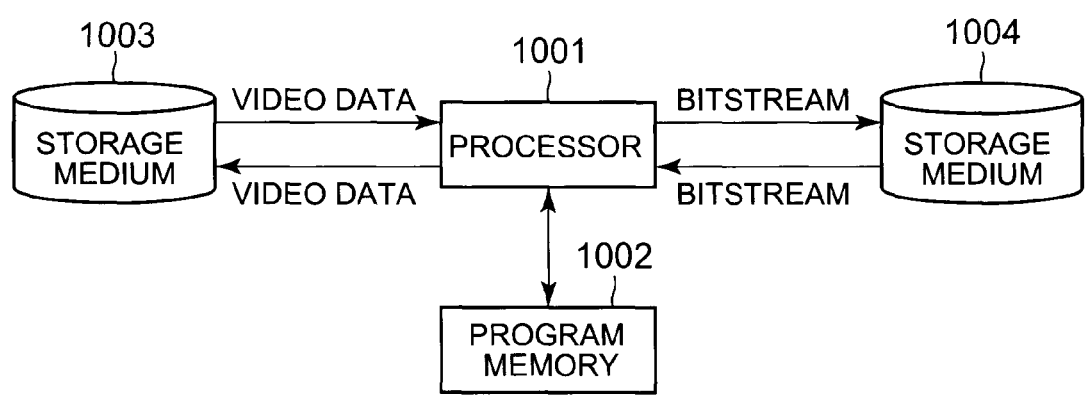
FIG. 12 It depicts a block diagram depicting an example of an information processing system using a program.

An information processing system depicted in FIG. 12 includes a processor 1001, a program memory 1002, a storage medium 1003 for storing video data, and a storage medium 1004 for storing a bitstream. The storage medium 1003 and the storage medium 1004 may be separate storage media, or storage areas on the same storage medium. A magnetic storage medium such as a hard disk can be used as a storage medium.

In the information processing system depicted in FIG. 12, a program for realizing the function of each block depicted in FIG. 1 is stored in the program memory 1002. Then, the processor 1001 executes processes according to the program stored in the program memory 1002 to realize the functions of the video coding device depicted in FIG. 1.

Figure 13:
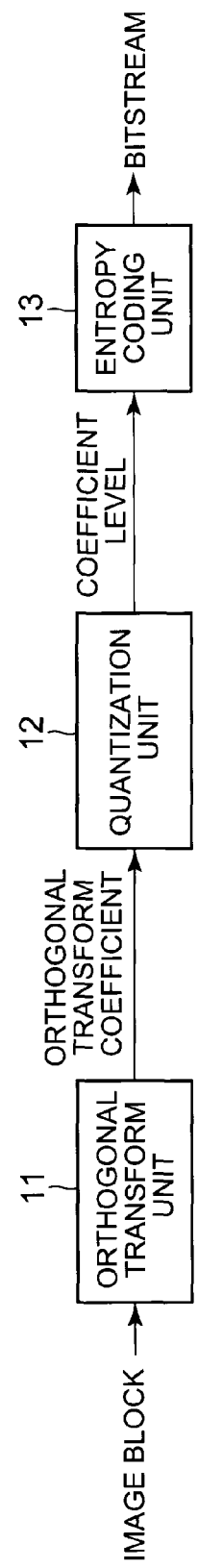
FIG. 13 It depicts a block diagram depicting main parts of a video coding device according to the present invention.
Figure 14:
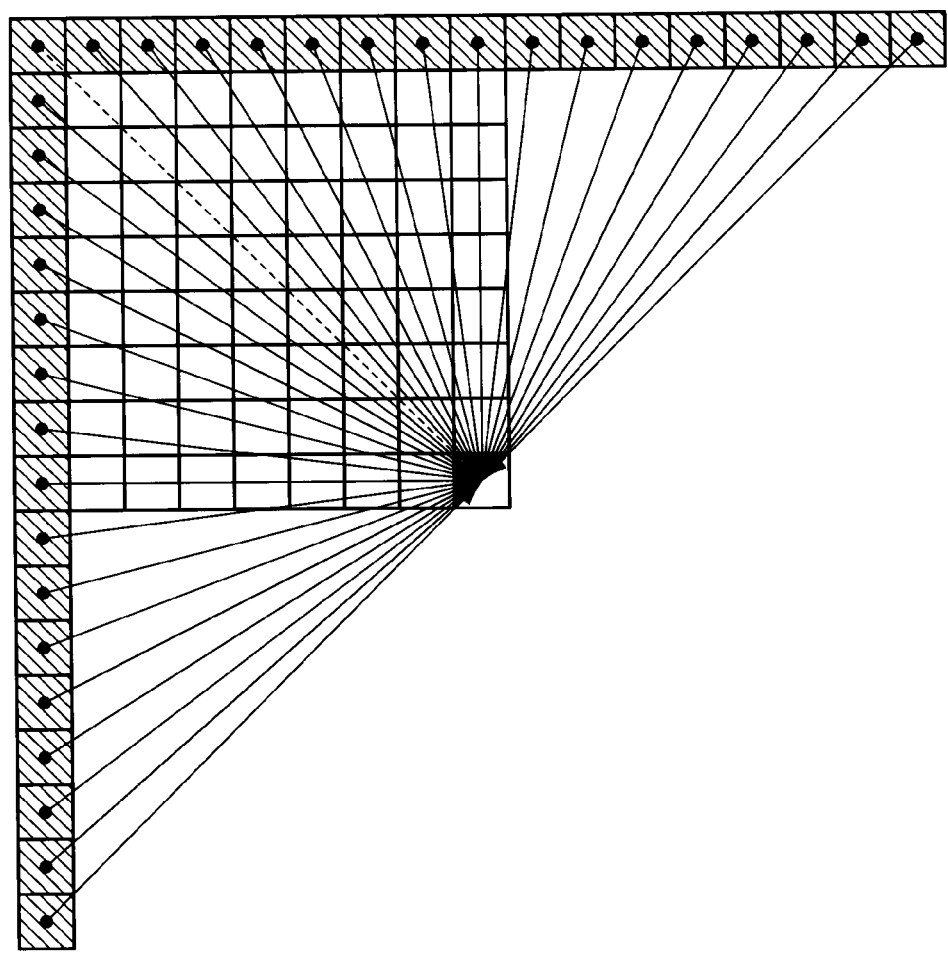
FIG. 14 It depicts an explanatory diagram depicting an example of 33 types of angular intra prediction.
Figure 15:
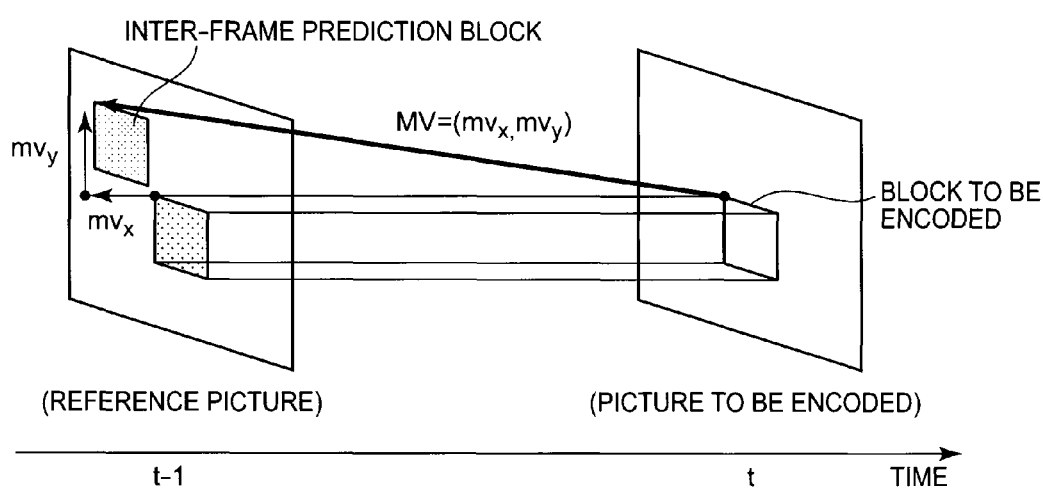
FIG. 15 It depicts an explanatory diagram depicting an example of inter-frame prediction.

FIG. 13 is a block diagram depicting main parts of a video encoding device according to the present invention. As depicted in FIG. 13, the video coding device according to the present invention includes: an orthogonal transform unit 11 which orthogonally transforms an image block to calculate an orthogonal transform coefficient; a quantization unit 12 which quantizes the orthogonal transform coefficient to calculate a coefficient level; and an entropy coding unit 13 which entropy-encodes location information on all significant coefficient levels among coefficient levels, and then entropy-encodes value information on each of the significant coefficient levels to output a bitstream, wherein the quantization unit 12 includes a number of location information bits calculating unit which calculates the number of bits of location information determined based on the location of a first significant coefficient level in order of transmission and included in the image block, a number of value information bits calculating means which calculates the number of value information bits of a significant coefficient level, and a high-cost coefficient level detection/removal unit which sets a significant coefficient level in which the number of location information bits and the number of value information bits meet a predetermined condition to 0.

While the aforementioned exemplary embodiments may be partly or wholly described in the following supplementary notes, the present invention is not limited to the following configurations.

(Supplementary Note 1)

A video coding device including: orthogonal transform means for orthogonally transforming an image block to calculate an orthogonal transform coefficient; quantization means for quantizing the orthogonal transform coefficient to calculate a coefficient level; and entropy coding means for entropy-encoding location information on all significant coefficient levels among the coefficient levels, and then entropy-encoding value information on each of the significant coefficient levels to output a bitstream, wherein the quantization means includes number of location information bits calculating means for calculating the number of bits of location information determined based on the location of a coefficient level to be significant first in order of transmission and included in the image block, number of value information bits calculating means for calculating the number of value information bits of a coefficient level to be significant, and high-cost coefficient level detection/removal means for setting a coefficient level to be significant in which the number of location information bits and the number of value information bits meet a predetermined condition to 0.

(Supplementary Note 2)

The video coding device of supplementary note 1, wherein when the number of location information bits is larger than the number of value information bits, the high-cost coefficient level detection/removal means sets the coefficient level to be significant to 0.

(Supplementary Note 3)

The video coding device of supplementary note 1 or supplementary note 2, wherein the quantization means includes square error reduction amount calculating means for calculating a square error reduction amount for an orthogonal transform coefficient using a quantization parameter and the coefficient level to be significant, and the high-cost coefficient level detection/removal means uses the number of location information bits, the number of value information bits, and the square error reduction amount to set the coefficient level to be significant in which the square error reduction amount becomes less than or equal to a value obtained by multiplying the sum of the number of location information bits and the number of the value information bits by a predetermined multiplier to 0.

(Supplementary Note 4)

The video coding device of supplementary note 3, wherein the square error reduction amount calculating means calculates the square error reduction amount using the quantization parameter, the significant coefficient level, and the orthogonal transform coefficient.

(Supplementary Note 5)

The video coding device of any one of supplementary note 1 to supplementary note 4, wherein the number of location information bits calculating means calculates, as the number of location information bits, the sum of the number of location information bits of a coefficient level to be significant first in order of transmission and the number of bits of information indicative of the positive or negative signs of all coefficient levels to be significant in the block, and the number of value information bits calculating means calculates, as the number of value information bits, the number of bits of information on the absolute values of the coefficient levels to be significant.

(Supplementary Note 6)

The video coding device of any one of supplementary note 1 to supplementary note 5, wherein only when the absolute value of the coefficient level to be significant is smaller than or equal to a predetermined threshold value, the quantization means uses the high-cost coefficient level detection/removal means.

(Supplementary Note 7)

The video coding device of supplementary note 6, wherein the predetermined threshold value is 2 or less.

(Supplementary Note 8)

The video coding device of supplementary note 7, wherein the number of value information bits calculating means sets, as a value obtained by subtracting 2 from the absolute value of the significant coefficient level, a value (the number of bits of remaining absolute value information) obtained by subtracting information indicating whether the significant coefficient level is larger than 1 and information indicating whether the significant coefficient level is larger than 2 from absolute value information on the significant coefficient level larger than 2 and included in the number of value information bits.

(Supplementary Note 9)

The video coding device of any one of supplementary note 5 to supplementary note 8, wherein the high-cost coefficient level detection/removal means is used only for orthogonal transform coefficients subjected to inter prediction.

(Supplementary Note 10)

The video coding device of any one of supplementary note 5 to supplementary note 9, wherein the quantization means quantizes a prediction error image to which transform based on an identity matrix instead of frequency transform is applied to calculate a coefficient level.

(Supplementary Note 11)

The video coding device of any one of supplementary note 5 to supplementary note 9, wherein in an image block larger than 4×4 (8×8 image block, 16×16 image block, or 32×32 image block), the number of location information bits calculating means includes, in the number of location information bits, the number of bits of information indicative of the presence or absence of a significant coefficient level in a 4×4 sub-block having 16 coefficient levels.

While the present invention has been described with reference to the exemplary embodiments and examples, the present invention is not limited to the aforementioned exemplary embodiments and examples. Various changes that can be understood by those skilled in the art within the scope of the present invention can be made to the configurations and details of the present invention.

This application is based upon and claims the benefit of priority from Japanese patent application No. 2012-285238, filed on Dec. 27, 2012, the disclosure of which is incorporated herein in its entirety by reference.

REFERENCE SIGNS LIST 11 orthogonal transform unit
12 quantization unit
13 entropy coding unit
101 transformer
1020-1025 adaptive quantizer
103 entropy encoder
104 inverse transformer/inverse quantizer
105 buffer
106 predictor
107 estimator
1001 processor
1002 program memory
1003 storage medium
1004 storage medium
1201 coefficient level calculation unit
1202 number of value information bits calculating unit ($R_{value}$ calculation unit)
1203 number of location information bits calculating unit ($R_{locate}$ calculation unit)
1204 high-cost coefficient level detection/removal unit
1205 square error reduction amount calculating unit (D calculation unit)
1206 number of absolute value information bits calculating unit ($R_{abs}$ calculation unit)
1207 number of locations/number of signs information bits calculating unit ($R_{locate\_sign}$ calculation unit)

What is claimed is:

1. A video coding device comprising:
a memory storing instructions; and
one or more processors configured to execute the instructions to:
transform an image block to calculate an orthogonal transform coefficient;
quantize the orthogonal transform coefficient to calculate a coefficient level;
entropy-encode location information on all significant coefficient levels among the coefficient levels, and then entropy-encode value information on each of the significant coefficient levels to output a bitstream;
calculate the number of bits of location information $R_{locate}$ which is a sum of the number of bits indicating a location of a coefficient level to be significant first in order of transmission and the number of bits respectively indicating the presence or absence of a significant coefficient level in a location subsequent to the location of the first significant coefficient level;
calculate the number of value information bits of a coefficient level to be significant; and
set a coefficient level to be significant in which the number of location information bits and the number of value information bits meet a predetermined condition to 0.

2. The video coding device according to claim 1, wherein when the number of location information bits is larger than the number of value information bits, the one or more processors are further configured to execute the instructions to set the coefficient level to be significant to 0.

3. The video coding device according to claim 1, wherein one or more processors are further configured to execute the instructions to:
calculate a square error reduction amount for an orthogonal transform coefficient using a quantization parameter and the coefficient level to be significant, and
use the number of location information bits, the number of value information bits, and the square error reduction amount to set the coefficient level to be significant in which the square error reduction amount becomes less than or equal to a value obtained by multiplying a sum of the number of location information bits and the number of value information bits by a predetermined multiplier to 0.

4. The video coding device according to claim 3, wherein the one or more processors are further configured to execute the instructions to calculate the square error reduction amount using the quantization parameter, the significant coefficient level, and the orthogonal transform coefficient.

5. A video coding method comprising:
orthogonally transforming an image block to calculate an orthogonal transform coefficient;
quantizing the orthogonal transform coefficient to calculate a coefficient level; and
entropy-encoding location information on all significant coefficient levels among the coefficient levels, and then entropy-encoding value information on each of the significant coefficient levels to output a bitstream,
wherein upon calculating the coefficient level, the method comprises
calculating the number of bits of location information $R_{locate}$ which is a sum of the number of bits indicating a location of a coefficient level to be significant first in order of transmission and the number of bits respectively indicating the presence or absence of a significant coefficient level in a location subsequent to the location of the first significant coefficient level,
calculating the number of value information bits of a coefficient level to be significant, and
setting a coefficient level to be significant in which the number of location information bits and the number of value information bits meet a predetermined condition to 0.

6. The video coding method according to claim 5, wherein the predetermined condition is that the number of location information bits is larger than the number of value information bits.

7. The video coding method according to claim 5, wherein upon calculating the coefficient level, the method comprises
calculating a square error reduction amount for an orthogonal transform coefficient using a quantization parameter and the coefficient level to be significant, and
using the number of location information bits, the number of value information bits, and the square error reduction amount to set the coefficient level to be significant in which the square error reduction amount becomes less than or equal to a value obtained by multiplying a sum of the number of location information bits and the number of the value information bits by a predetermined multiplier to 0.

8. The video coding method according to claim 7, wherein the square error reduction amount is calculated using the quantization parameter, the significant coefficient level, and the orthogonal transform coefficient.

9. A non-transitory computer readable information recording medium storing a video coding program when executed by a processor, performs:
orthogonally transforming an image block to calculate an orthogonal transform coefficient;

quantizing the orthogonal transform coefficient to calculate a coefficient level; and entropy-encoding location information on all significant coefficient levels among the coefficient levels, and then entropy-encoding value information on each of the significant coefficient levels to output a bitstream, when calculating the coefficient level, calculating the number of bits of location information $R_{locate}$ which is a sum of the number of bits indicating a location of a coefficient level to be significant first in order of transmission and the number of bits respectively indicating the presence or absence of a significant coefficient level in a location subsequent to the location of the first significant coefficient level, calculating the number of value information bits of a coefficient level to be significant, and setting a coefficient level to be significant in which the number of location information bits and the number of value information bits meet a predetermined condition to 0.

10. The non-transitory computer readable information recording medium according to claim 9, performs setting a coefficient level to be significant to 0 when the number of location information bits is larger than the number of value information bits.

\* \* \* \* \*